(12) United States Patent
Ono

(10) Patent No.: US 6,807,295 B1
(45) Date of Patent: Oct. 19, 2004

(54) STEREOSCOPIC IMAGING APPARATUS AND METHOD

(75) Inventor: Shuji Ono, Kaisei-Machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 587 days.

(21) Appl. No.: 09/605,984

(22) Filed: Jun. 29, 2000

(30) Foreign Application Priority Data

Jun. 29, 1999 (JP) .......................................... 11-184153
Jun. 29, 1999 (JP) .......................................... 11-184163

(51) Int. Cl.$^7$ ................................................ G06K 9/00
(52) U.S. Cl. ..................... 382/154; 348/42; 396/324; 359/376
(58) Field of Search ............................... 382/103, 108, 382/106, 159, 168, 199, 201, 285, 305; 348/42–59; 396/324, 327, 331; 600/111, 117; 359/691, 462, 472, 473, 464, 480, 497, 386, 376

(56) References Cited

U.S. PATENT DOCUMENTS

| | | | | |
|---|---|---|---|---|
| 4,864,629 A | * | 9/1989 | Deering ...................... | 365/239 |
| 5,060,282 A | * | 10/1991 | Molley ........................ | 382/278 |
| 5,907,434 A | * | 5/1999 | Sekine et al. ................ | 359/462 |
| 6,005,978 A | * | 12/1999 | Garakani ..................... | 382/218 |
| 6,057,892 A | * | 5/2000 | Borer .......................... | 348/699 |
| 6,075,555 A | * | 6/2000 | Street ......................... | 348/43 |
| 6,384,859 B1 | * | 5/2002 | Matsumoto et al. .......... | 348/43 |
| 6,445,814 B2 | * | 9/2002 | Iijima et al. ................ | 382/154 |
| 6,477,267 B1 | * | 11/2002 | Richards ..................... | 382/154 |

* cited by examiner

Primary Examiner—Bhavesh M. Mehta
Assistant Examiner—Sheela Chawan
(74) Attorney, Agent, or Firm—Birch, Stewart, Kolasch & Birch, LLP

(57) ABSTRACT

Stereoscopic imaging apparatus and method capable of simultaneously imaging the stereoscopic images while an object is viewed from different points so as to accurately measure the distance of the object. The stereoscopic imaging apparatus includes: an optical image forming unit having a single optical axis, which image-forms the object; a light receiving unit in which a plurality of light receiving elements are arranged; a light passing portion; an imaging unit which simultaneously images both a first image that image-forms the object after passing through the first opening and a second image that image-forms the object after passing through the second opening, on the light receiving unit; and a distance calculating unit which calculates a distance between the optical image forming unit and the object.

38 Claims, 22 Drawing Sheets

STEREOSCOPIC IMAGING APPARATUS AND METHOD

This patent application claims priority based on a Japanese patent application, H11-184153 filed on Jun. 29, 1999 and H11-184163 filed on Jun. 29, 1999, the contents of which are incorporated herein by reference.

BACKGROUND OF THE INVENTION

1. Field of the Invention

The present invention relates to stereoscopic imaging apparatus and camera and method therefor which pick up a stereoscopic image when an object is viewed from different points. More particularly, the present invention relates to the stereoscopic imaging apparatus and camera which image simultaneously a plurality of stereoscopic images.

2. Description of the Related Art

In the field of image processing as well as image recognition, generally adopted as a method to extract data of an object in the depth direction is a method in which a stereoscopic amount between stereoscopic images is detected utilizing a plurality of stereoscopic images obtained when the object is viewed from different points, so that the depth level up to the object is calculated from the stereoscopic amount.

As conventionally available apparatus which images a plurality of stereoscopic images, there is stereoscopic imaging apparatus shown in FIG. 1. The stereoscopic imaging apparatus includes a light passing portion 5 which includes an opening that passes the light on a pupil plane of the optical lens 4. The opening is moved in the parallel direction to the optical lens 4, and the image having passed the opening is imaged on a light receiving unit, so that a plurality of the stereoscopic images are imaged in sequence (see Japanese Patent Application Laid-Open No. Hei 10-42314).

When the opening is situated at 6a shown in FIG. 1, an image 3c in which an object 3 is focused is formed in a position away from the light receiving unit 7, so that an out-of-focus image 3a is imaged on the light receiving unit 7. When the opening is moved to a position 6b shown in FIG. 1, the image 3c in which the object 3 is focused is formed in the same position. However, in the light receiving unit 7 the out-of-focus image 3b is imaged on a position different from 3a. A displacement between the image imaged in the light receiving unit 7 and 3b is called a stereoscopic amount. By measuring the stereoscopic amount, a distance from the optical lens 4 to the object 3 can be calculated using a lens formula since both the distance between a position 6a and a position 6b in the opening unit and a focal length are known. By detecting the stereoscopic amount about all regions of the object and then calculating the distances between the optical lens 4 and the all regions, the distance distribution can be obtained.

Moreover, as another method of imaging the stereoscopic image, a plurality of openings are provided in the light passing portion 5, and one of the openings is opened with other openings being closed in a predetermined time interval, so that a plurality of the stereoscopic images can be imaged in sequence (see Japanese Patent Application Laid-Open No. H10-271534).

In order to obtain the depth of the object, the stereoscopic amount needs to be detected by comparing the images among the stereoscopic images. However, when a plurality of stereoscopic images are imaged in the above manner, a time lag occurs between when the first stereoscopic image is taken and when the second stereoscopic image is taken. Thus, if a camera is held by a hand, an error due to such unstable holding may result. Moreover, the object may move during this time lag. Thus, the error will result inevitably in a plurality of the stereoscopic images taken, and is problematic in that information on the correct depth of the object can not be obtained.

SUMMARY OF THE INVENTION

Therefore, it is an object of the present invention to provide stereoscopic imaging apparatus and method which overcome the above issues in the related art. This object is achieved by combinations described in the independent claims. The dependent claims define further advantageous and exemplary combinations of the present invention.

According to an aspect of the present invention, there is provided a stereoscopic imaging apparatus for imaging a plurality of stereoscopic images obtained when an object is viewed from different points, the apparatus comprising: an optical image forming unit having a single optical axis, which image-forms the object; a light receiving unit in which a plurality of light receiving elements are arranged and the object is image-formed by the optical image forming unit; alight passing portion including first and second openings through which light having passed through first and second regions in the optical image forming unit is irradiated to the light receiving unit; and an optical separation portion which simultaneously images both a first image having passed through the first opening and a second image having passed through the second opening, on the different light receiving elements of the light receiving unit.

Preferably, the first and second openings of the light passing portion are equipped with first and second opening optical filters which transmit different optical light components, respectively.

The optical separation portion may includes: a first light receiving portion optical filter which transmits again a light component having transmitted through the first opening optical filter; and a second light receiving portion optical filter which transmits again a light having transmitted through the second opening optical filter, wherein the first light receiving portion optical filter and the second light receiving optical filter are arranged in an alternate order.

The first and second opening optical filters of the light passing portion are, preferably, opening specific wavelength component transmitting filters which transmit different specific wavelength components of the light, respectively.

The optical separation portion may include: a first light receiving portion specific wavelength component transmitting filter which transmits the light having the same wavelength component as the first opening specific wavelength transmitting filter of the light passing portion; and a second light receiving portion specific wavelength component transmitting filter which transmits the light having the same wavelength component as the second opening specific wavelength component transmitting filter of the light passing portion, wherein the light receiving unit is covered in a manner such that the first and second light receiving portion specific wavelength component transmitting filters are arranged in alternate order.

Moreover, the first light receiving portion specific wavelength component transmitting filter may include: filters that transmit specific RGB wavelength components ($\lambda R1$, $\lambda G1$ and $\lambda B1$), respectively, and the second light receiving portion specific wavelength component transmitting filter may include: filters that transmit specific RGB wavelength components (λR2, λG2 and λB2), respectively, and wherein the filter transmitting the wavelength λR1 and the filter transmitting λR2 are arranged adjacently; the filter transmitting the wavelength λG1 and the filter transmitting λG2 are arranged adjacently; and the filter transmitting the wavelength λB1 and the filter transmitting λB2 are arranged adjacently.

Moreover, the first and second opening optical filter of the light passing portion are, preferably, opening specific polarization component transmitting filters that transmit the light having a polarization plane of the horizontal direction and a polarization plane of the vertical direction, respectively.

Moreover, the optical separation portion may include light receiving portion specific polarization component transmitting filters which transmit the light having polarization planes of the horizontal and vertical directions, and the light receiving portion specific polarization component transmitting filters which transmit the light having polarization planes of the horizontal and vertical directions are, preferably, arranged in an alternate manner so as to cover the light receiving unit.

Moreover, the optical separation portion may include a polarization component separating portion that separates the light having polarization planes of the horizontal and vertical directions, and the light receiving unit may include: a first light receiving plane which receives light having the horizontal-direction polarization plane separated by the polarization component separating portion; and a second light receiving plane which receives light having vertical-direction polarization plane separated by the polarization component separating portion.

The apparatus may further comprise an electrically separating portion which electrically separates the first image that is imaged by the light receiving unit from the second image that is imaged by the light receiving unit.

The light receiving element is preferably a charge-coupled device, and the light receiving unit preferably comprises a photoelectric conversion image element in which a plurality of charge-coupled devices are arranged.

According to another aspect of the present invention, there is provided a camera for acquiring data on a distance between the camera and an object, comprising: a first optical image forming unit having a single optical axis, which image-forms the object; a first light receiving unit in which a plurality of light receiving elements are arranged and the object is image-formed by the first optical image forming unit; a light passing portion including first and second openings through which light having passed through first and second regions in the first optical image forming unit is irradiated to the first light receiving unit; an optical separation portion which simultaneously images both a first image having passed through the first opening and a second image having passed through the second opening, on the different light receiving elements of the first light receiving unit; and a distance calculating unit which calculates a distance between the optical image forming unit and at least a point on the object, based on the first and second images.

The camera may further comprise: a second optical image forming unit which image forms the object; a second light receiving unit which image-forms the object by the second optical image forming unit; and a control unit which controls at least one of focusing and aperture of the second optical image forming unit, and exposure time of the second light receiving unit, based on the distance calculated by the distance calculating unit.

Moreover, the camera may further comprise: a second light receiving unit which image-forms the object by the first optical image forming unit; and a control unit which controls at least one of focusing and aperture of the first optical image forming unit, and exposure time of the second light receiving unit, based on the distance calculated by the distance calculating unit.

Moreover, the camera may further comprise a drive unit which moves the light passing portion and the optical separation portion out of an optical path defined by a space such that the object is light-received by the first light receiving unit.

The light passing portion further may include a third opening which irradiates to the first light receiving unit the light having passed through a third region in the first optical image forming unit, so that while the optical serration portion opens the first and second openings and closes the third opening in the light passing portion, the first image having passed through the first opening and the second image having passed through the second opening are simultaneously imaged on the different light receiving elements, and also while the optical separation portion closes the first and second openings and opens the third opening in the light passing portion, the image having passed through the third opening is imaged on the light receiving element.

Preferably, the first,second and third openings in the light passing portion include an LCD shutter.

The distance calculating unit calculates a distance between the optical image forming unit and the object that is image-formed on a first pixel address of the first image, based on the first pixel address of the first image and a second pixel address in the second image of the object that is image-formed on the first image address.

Moreover, the camera may further comprise a recoding unit which records an image imaged by the second light receiving portion and the distance calculated by the distance calculating unit.

According to still another aspect of the present invention, there is provided a stereoscopic apparatus comprising: an optical image forming unit having a single optical axis, which image-forms the object; a light receiving unit in which a plurality of light receiving elements are arranged and the object is image-formed by the optical image forming unit; a light passing portion including first and second openings through which light having passed through first and second regions in the optical image forming unit is irradiated to the light receiving unit; an imaging unit which simultaneously images both a first image that image-forms the object after passing through the first opening and a second image that image-forms the object after passing through the second opening, on the light receiving unit; and a distance calculating unit which calculates a distance between the optical image forming unit and at least a point on the object, based on the image imaged on the light receiving unit.

The distance calculating unit preferably includes a stereoscopic amount detecting unit which detects a stereoscopic amount of the first image having passed through the first opening and the second image having passed through the second opening in terms of a specific region of an image imaged in the light receiving unit, so that the distance between the optical image forming unit and the object imaged at the specific region is calculated based on the stereoscopic amount.

The distance calculating unit may further include: an auto-correlation calculating unit which calculates correlation between the image of the specific region imaged in the light receiving unit and a reference image acquired by shifting the image in a stereoscopic direction, while a shifted amount thereof is varied by a predetermined amount, so that the stereoscopic detecting unit obtains the stereoscopic amount utilizing the correlation calculated by the auto-correlation calculating unit.

The distance calculating unit may further include: an edge extracting unit which extracts an edge image of the image imaged by the light receiving unit, whereby the auto-correlation calculating unit calculates correlation between the edge image of the specific region imaged by the light receiving unit and the reference image acquired by shifting the edge image in the stereoscopic direction while a shifted amount is varied by a predetermined amount.

The auto-correlation calculating unit calculates correlation between the image of the specific region imaged by the light receiving unit and the reference image acquired by shifting the image in the substantially same direction as that in which the first and second openings of the light passing portion are arranged, while a shifted amount is varied by a predetermined amount.

The apparatus may further comprise: a second optical image forming unit which image forms the object; a second light receiving unit which image-forms the object by the second optical image forming unit; and a control unit which controls at least one of focusing and aperture of the second optical image forming unit, and exposure time of the second light receiving unit, based on the distance calculated by the distance calculating unit.

The apparatus may further comprise: a second light receiving unit which image-forms the object by the first optical image forming unit; and a control unit which controls at least one of focusing and aperture of the first optical image forming unit, and exposure time of the second light receiving unit, based on the distance calculated by the distance calculating unit.

Moreover, the apparatus may further comprise a recoding unit which records an image imaged by the second light receiving portion and the distance calculated by the distance calculating unit.

Moreover, the apparatus may further comprise: a drive unit which moves the light passing portion out of an optical path defined by a space such that the object is light-received by the light receiving unit; and a control unit which controls the optical image forming unit or the light receiving unit utilizing the distance calculated by the distance calculating unit.

The light passing portion may further include: a third opening which irradiates to the light receiving unit the light having passed through a third region in the optical image forming unit; a control unit which controls the optical image forming unit or the light receiving portion based on the distance calculated by the distance calculating unit; and a drive unit such that, when imaging a stereoscopic image of the object, while the third opening is being closed and the first and second openings of the light passing portion are opened, an image having passed through the first opening and an image having passed through the second opening are simultaneously imaged, and, when imaging the object, while the third opening of the light passing portion is being opened, an image having passed through is imaged by the light receiving unit.

Preferably, the first and second openings of the light passing portion are provided in the peripheral vicinity of the optical image forming unit, the third opening of the light passing portion is provided in a region including an optical axis of the optical image forming unit, and the third opening occupies larger region than that occupied by the first and second openings.

According of still another aspect of the present invention there is provided a stereoscopic imaging method for imaging a plurality of stereoscopic images acquired when an object is viewed from different points, the method comprising: picking up an image of the object at a light receiving unit via a light passing portion which restricts a passage of light in a region other than the different points; extracting an edge image of the image imaged in the light receiving unit; calculating correlation between the edge image of a specific region and a reference image acquired by shifting the edge image in a stereoscopic direction connecting the different points while a shifted amount is varied by a predetermine amount; obtaining a stereoscopic amount of the edge image of the specific region and the reference image based on the shifted amount at which the level of the correlation becomes minimum; and calculating a distance between an optical image forming unit and the object imaged at the specific region.

The method may further comprise: adjusting an imaging condition based on the calculated distance; removing a restriction set forth at the step of picking up the image; and imaging the object under the adjusted imaging condition.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

First Embodiment

Figure 1:
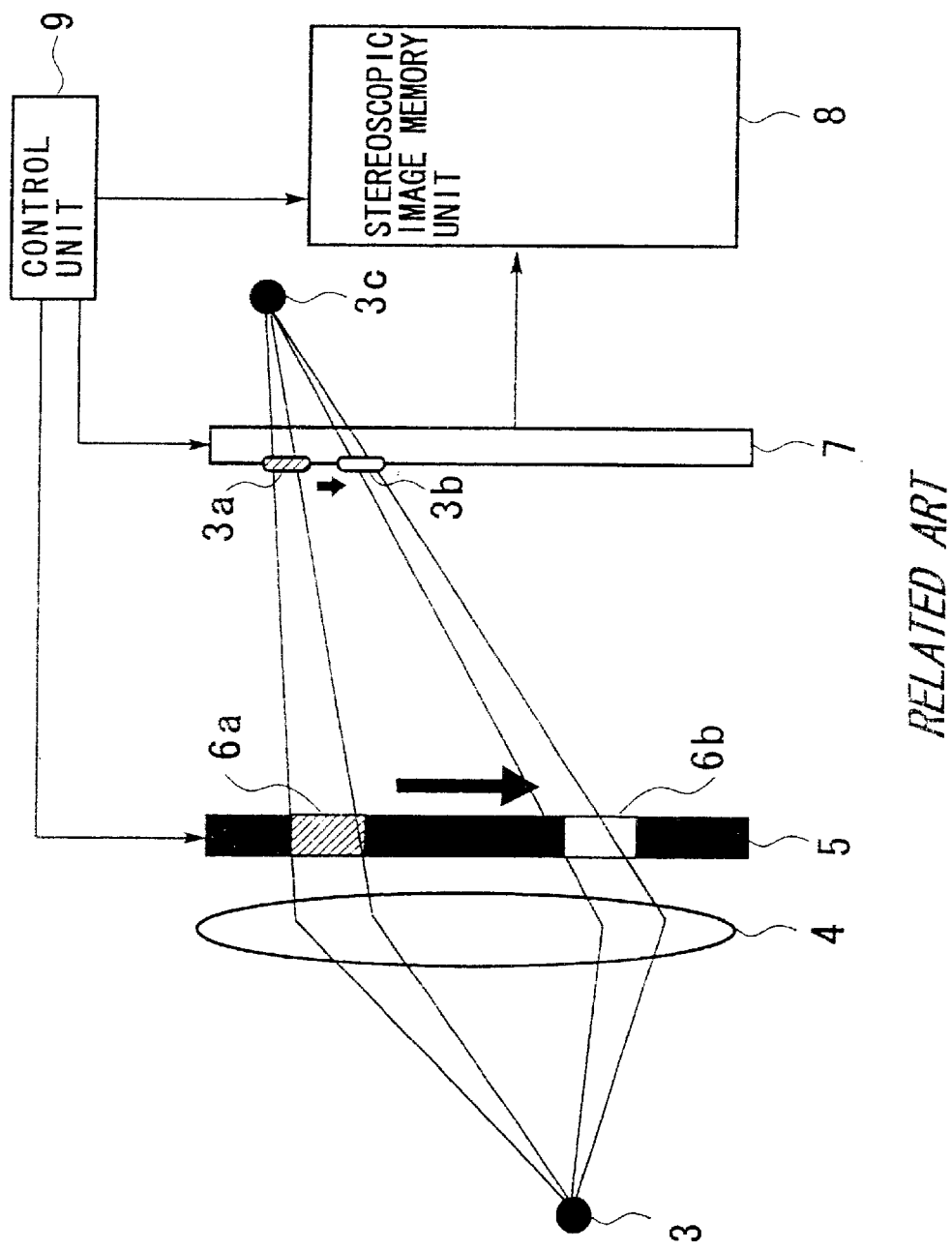
FIG. 1 shows a structure of the conventional stereographic imaging apparatus.
Figure 2:
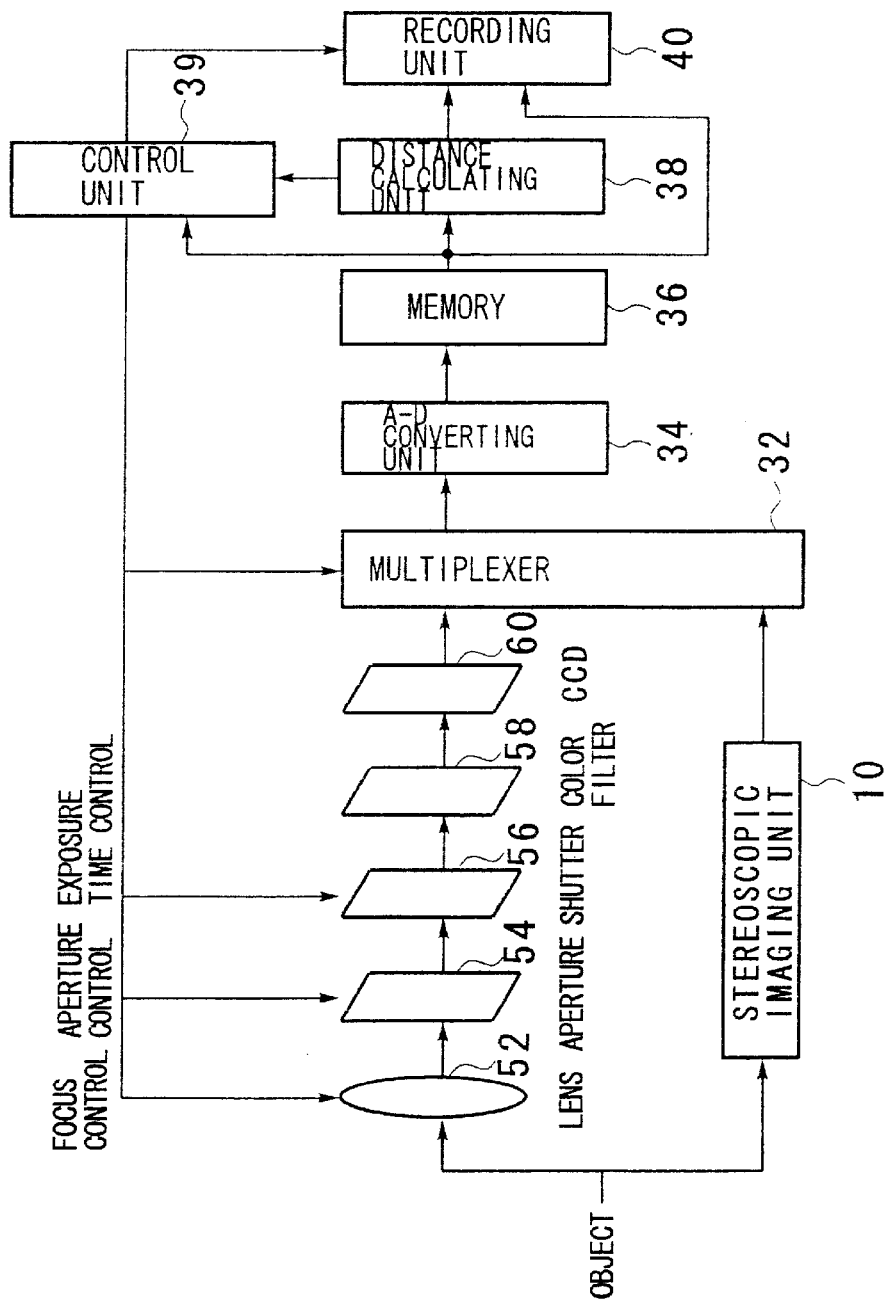
FIG. 2 shows a configuration of a camera according to the present embodiment.

FIG. 2 shows a configuration of a camera according to the present embodiment. Exemplary stereoscopic imaging apparatus according to the present embodiment comprises: a stereoscopic imaging unit 10; a lens 52; an aperture 54; a shutter 56; a color filter 58; a CCD (charge-coupled device) 60; a multiplexer 32; an A-D converting unit 34, a memory 36; a distance calculating unit 38; a control unit 39; and a recording unit 40.

The stereoscopic imaging unit 10 picks up the stereoscopic image of the object, and outputs an output signal to the multiplexer 32. The lens 52 image-forms the object, the aperture 54 adjusts the aperture amount, and the shutter 56 adjusts an exposure time. The color filter 58 decomposes the light having passed through the lens 52, into RGB components. The CCD 60 receives an image of the object that is image-formed by the lens 52 and converts it to an electric signal so as to be output to the multiplexer 32.

The multiplexer 32 outputs to the A-D converting unit 34 an output signal of either the stereoscopic imaging unit 10 or the CCD 60. The A-D converting unit 34 converts an input analog signal to a digital signal so as to be output to the memory 36. the memory 36 stores the input digital signal. Moreover, the memory 36 stores the image of the object which the lens 52 images in the CCD, and the stereoscopic image of the object which the stereoscopic imaging unit 10 images.

The distance calculating unit 38 reads out a stereoscopic image out of the memory 36, and calculates a distance between the camera and the object based on the stereoscopic image.

The control unit 39 controls at least one of the focus of the lens, the aperture amount of the aperture 54 and the exposure time of the shutter 56, based on the color data, luminance and chroma of the object's image read out of the memory 36 and the data output from the distance calculating unit 38.

The recording unit 40 records the object's image read out of the memory 36 and the object's distance output from the distance calculating unit 38. Moreover, the recording unit 40 may be a non-volatile memory such as a magnetic recoding medium and a flash memory.

In the conventional practice, a main object is extracted based on the color distribution, luminance distribution, textural distribution of the object's image and so on. However, if no difference between the main object and other parts of the object is obvious in terms of the color distribution, luminance distribution, textural distribution and the like, the other parts of the object are hardly discriminated from the main object. Thus, it is difficult to judge which object to be focused and how to adjust imaging (photographing) conditions such as the aperture amount and the exposure time.

By implementing the present embodiment, the object's distance distribution imaged for each pixel of the object can be obtained, so that the main object can be further reliably extracted based on the object's distance distribution data in addition to the data of the color distribution, luminance distribution, textural distribution and the like of the object's image. In this manner, the adjustment of imaging conditions such as the focusing, aperture amount and the exposure time is properly carried out for the extracted main object.

Figure 3:
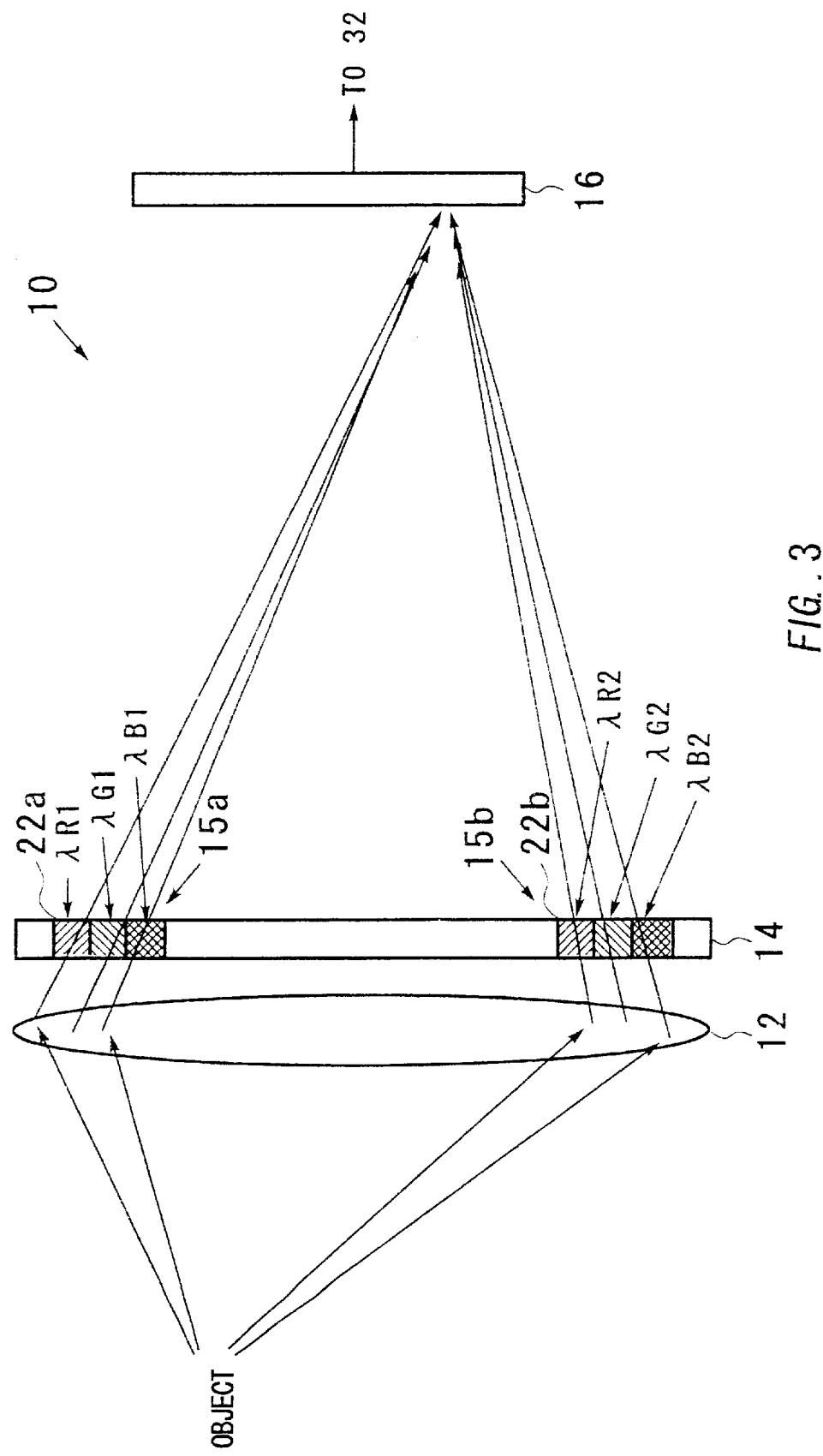
FIG. 3 shows a configuration of the stereoscopic image unit 10.

FIG. 3 shows a configuration of the stereoscopic image unit 10. The stereoscopic imaging unit 10 comprises: an optical image forming unit 12 which image-forms the light of the object; a light passing portion 14 including a first opening 15a and a second opening 15b which irradiate to the imaging unit 16 the light having passed the optical image forming unit 12; and an imaging unit 16 which images (photographs) the object that is image-formed by the optical image forming unit 12.

The image passing portion 14 is placed on the pupil plane of the optical image-forming unit 12, and the light passes through the first opening 15a and second opening 15b while the light is shielded off in other portions than the first and second openings 15a and 15b. The first and second openings 15a and 15b of the light passing portion 14 includes, as an exemplary opening optical filter, a first opening specific wavelength component transmitting filter 22a and a second opening specific wavelength component transmitting filter 22b, respectively, which transmit different light components. The first opening specific wavelength component transmitting filter 22a passes the light having three wavelength components consisting of a red-zone wavelength component $\lambda R1$, a green-zone wavelength component $\lambda G1$ and a blue-zone waveform component $\lambda B1$. The second opening specific wavelength component transmitting filter 22b passes the light having three wavelength components consisting of a red-zone wavelength component $\lambda R2$, a green-zone wavelength component $\lambda G2$ and a blue-zone waveform component $\lambda B2$.

Figure 4:
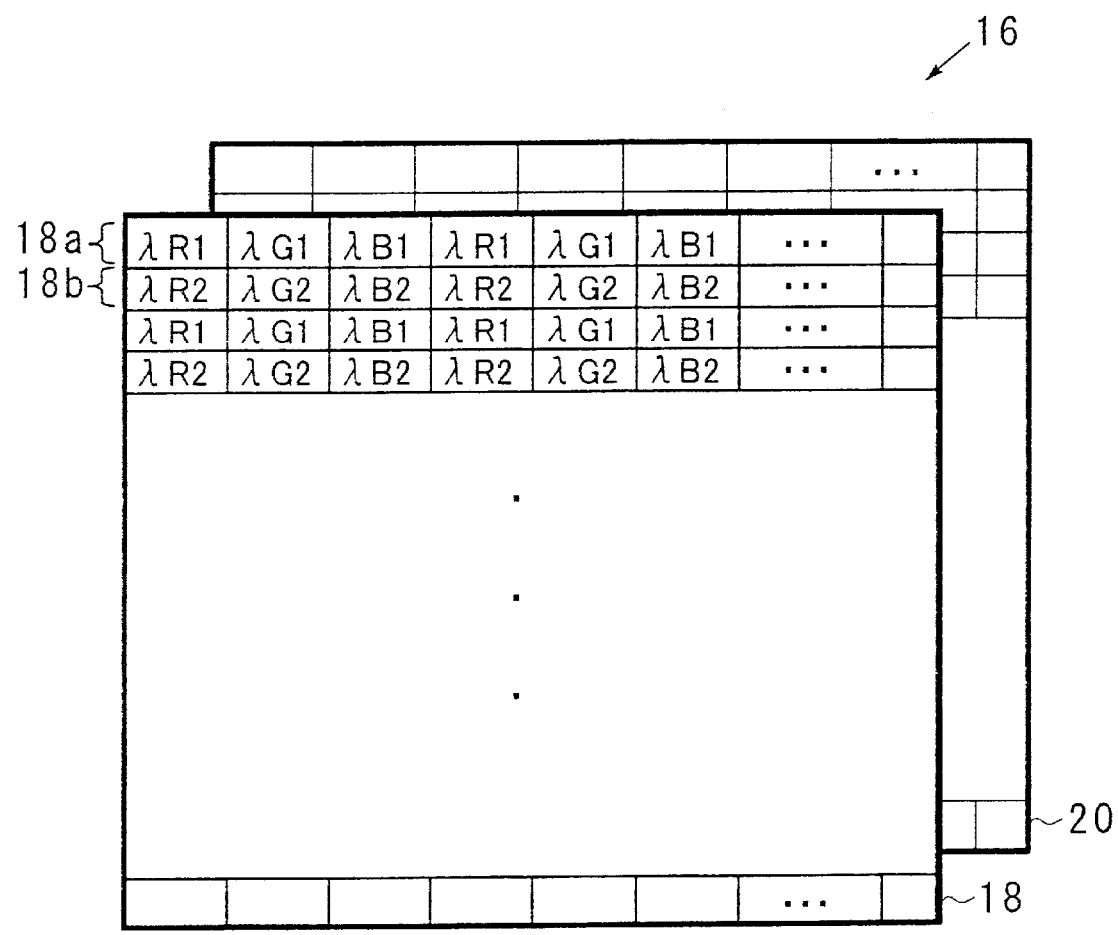
FIG. 4 shows a configuration of the imaging unit 16.

FIG. 4 shows a configuration of the imaging unit 16. In the imaging unit 16, a plurality of light receiving elements are arranged in the form of a matrix. The imaging unit 16 comprises a light receiving unit 20 in which the object is image-formed by the optical image-forming unit, and a light receiving portion specific wavelength component transmitting filter 18, as an exemplary light receiving optical filter, which covers the front surface of the light receiving unit 20. The light receiving element of the light receiving unit 20 may be, for example, a photoelectric conversion element such as a CCD (charge-coupled device), so that the light receiving unit 20 may be a photoelectric conversion imaging member in which a plurality of CCD's are arranged.

Referring to FIG. 4, the light receiving portion specific wavelength component transmitting filter 18 comprises: a first light receiving portion specific wavelength component transmitting filter 18a which transmits the light having the same wavelength component (red-zone wavelength component λR1, green-zone wavelength component λG1 and blue-zone waveform component λB1) as the first opening specific wavelength component transmitting filter 22a; and a second light receiving portion specific wavelength component transmitting filter 18b which transmits the light having the same wavelength component (red-zone wavelength component λR2, green-zone wavelength component λG2 and blue-zone waveform component λB2) as the second opening specific wavelength component transmitting filter 22b.

The first filter 18a comprises filters which transmit the wavelength components λR1, λG1 and λB1, respectively. The second filter 18b comprises filters which transmit the wavelength components λR2, λG2 and λB2, respectively.

The first and second filters 18a and 18b are so arranged that the filters transmitting the wavelength components λR1, λG1 and λB1, respectively, and the filters transmitting the wavelength components λR2, λG2 and λB2, respectively, are evenly distributed and arranged without deviation.

For example, the first and second filters 18a and 18b may be alternately arranged in the horizontal direction (a direction vertical to a direction in which the opening 15a and the opening 15b are arranged in FIG. 3) so as to cover the light receiving 20. In this case, the respective filters which transmit the wavelength components λR1, λG1 and λB1 are arranged in sequence in the horizontal direction in the first filter 18a. Moreover, in the second filter 18b, the respective filters which transmit the wavelength components λR2, λG2 and λB2 are arranged in sequence in the horizontal direction.

Moreover, the filter transmitting the wavelength λR1 and the filter transmitting λR2 are arranged adjacently in the vertical direction (a direction in which the opening 15a and the opening 15b are arranged in FIG. 3). Moreover, the filter transmitting the wavelength λG1 and the filter transmitting λG2 are arranged adjacently in the vertical direction. Similarly, the filter transmitting the wavelength λB1 and the filter transmitting λB2 are arranged adjacently in the vertical direction.

The resultant operations in which the first and second filters 18a and 18b are arranged in this manner will be described with reference to FIG. 3.

The light component having transmitted through the first opening specific wavelength component transmitting filter 22a, transmitted through the first filter 18a again, and is light-received at a position corresponding to the light receiving unit 20. The light component having transmitted through the second opening specific wavelength component transmitting filter 22b, transmitted through the first filter 18a again, and is light-received at a position corresponding to the light receiving unit 20.

Therefore, both the first image which is transmitted through the first opening and image-formed and the second image which is transmitted and image-formed, are separated optically, so that they can be imaged simultaneously on different light receiving elements in the light receiving unit 20.

Figure 5:
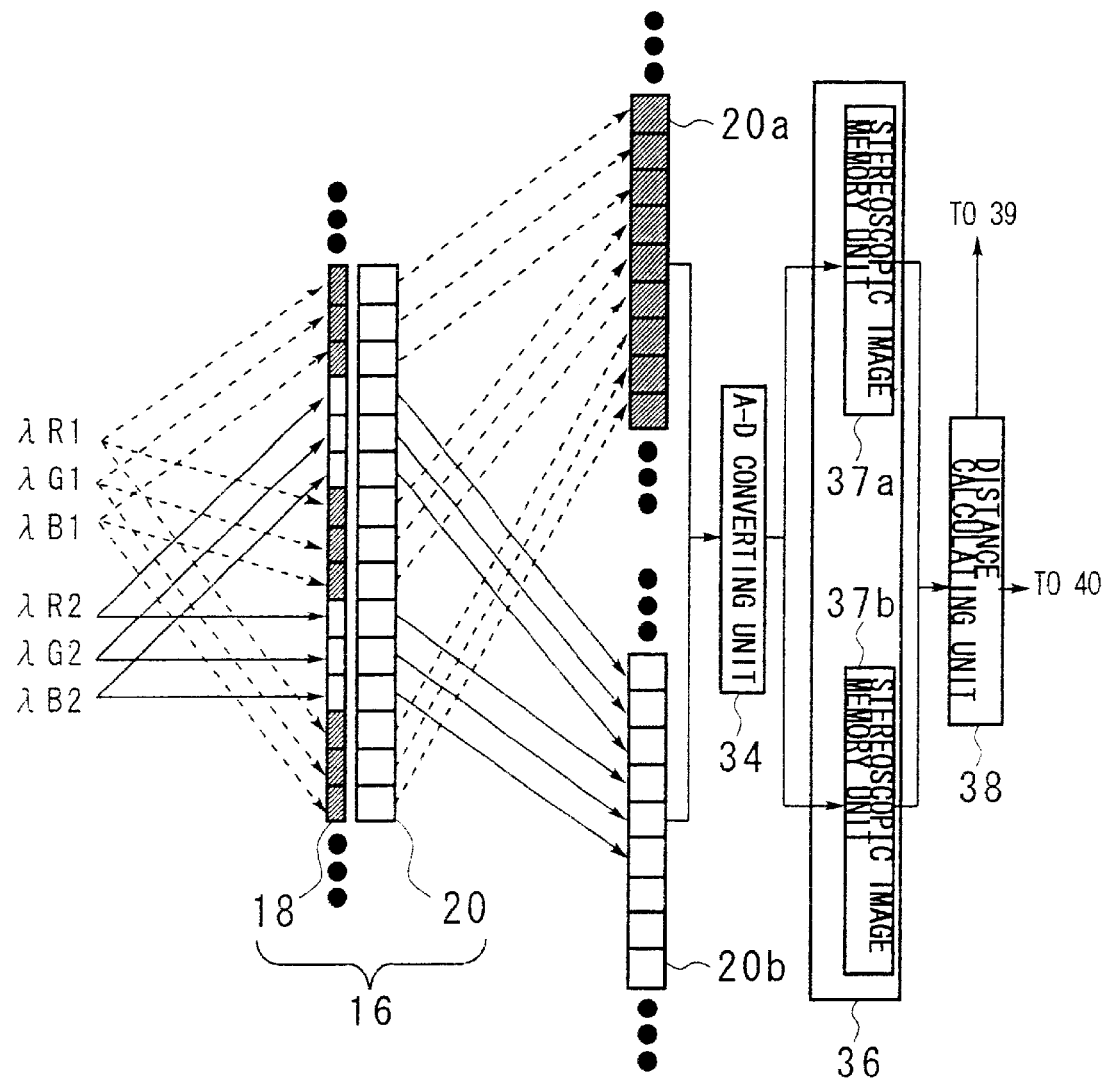
FIG. 5 shows a configuration of a processing unit in which the imaged stereoscopic image is processed.

FIG. 5 shows a configuration of a processing unit in which the imaged stereoscopic image is processed, and which comprises a light receiving portion specific wavelength component transmitting filter 18, a light receiving unit 20, an A-D converting unit 34, a memory 36 and a distance calculating unit 38.

The A-D converting unit 34 converts an output signal of the light receiving unit 20 into a digital signal so as to be output to the memory 36. Though a multiplexer is omitted in this figure, the actual operation is such that the output signal of the light receiving unit 20 is sent to the A-D converting unit through the multiplexer.

The memory 36 includes stereographic image memory units 37a and 37b. The stereographic image memory units 37a and 37b store the first image 20a and the second image 20b which have been imaged in the light receiving unit 20 after transmitted through the filter 18, respectively.

The operation of the stereoscopic image memory units 37a and 37b will be described with reference to FIG. 3 and FIG. 4.

Whether or not each pixel of the light receiving unit 20 receives the light that transmitted through which of the first and second filters 18a and 18b shown in FIG. 4 can be determined based on the arrangement of the first and second filters 18a and 18b.

Therefore, the first image having transmitted through the first opening and the second image having transmitted through the second opening shown in FIG. 3 can be further separated electrically, so as to be stored in the stereoscopic image memory units 37a and 37b.

After the analog output of the light receiving element of the light receiving unit 20 is converted to the digital signal by the A-D converting unit 34, the stereoscopic image memory units 37a and 37b can separate the first image from the second image so as to be stored therein. According to another embodiment, there may be provided a circuit which separates the analog output of the light receiving element of the light receiving unit 20, so that the first image and the second image are separated at a stage of the analog signal, thereafter, are converted to the digital signal by the A-D converting unit 34 so as to be stored therein.

The distance calculating unit 38 reads out the first image and the second image stored in the stereoscopic image memory units 37a and 37b, detects the stereoscopic amount thereof and calculates the distance distribution data of the object.

Though the case where the first and second images imaged (photographed) at the light receiving unit 20 are electrically separated and stored in the stereoscopic image memory units 37a and 37b was described in the above, the first and second images may be stored in a manner that they are not electrically separated. In this latter case, the distance calculating unit 38 reads the images stored in the memory 36. Then, which image belongs to the first image and the second can be identified based on a stored position inside the memory, so that the first image and the second image are logically identified. Thereafter, the stereoscopic amount is detected, so that the distance distribution data of the object can be calculated.

Next, described is a method in which the distance calculating unit 38 detects the stereoscopic amount from the first and second images so as to calculate the distance distribution data of the object. The region of the object imaged on the first and second images contains a certain constant stereoscopic amount. By detecting this stereoscopic amount, the distance between the optical image forming unit 12 and the region of the object can be calculated using the lens formula since the distance between the opening 15a and the opening 15b and the focal length of the optical image forming unit 12 shown in FIG. 3 are known. In this manner, detecting the stereoscopic amount about all regions of the object and calculating the distance between the optical image forming unit 12 and the region results in acquisition of the distance distribution of the object.

As described before, when the memory 36 stores in a manner that the first and second images are not separated, the first image and the second image are alternately stored. In this case, the distance calculating unit 38 reads necessary data from the memory 36 based on an image address of the first image as well as an image address of the second image corresponding to its pixel, so that how far the object is located can be calculated.

Second Embodiment

Figure 6:
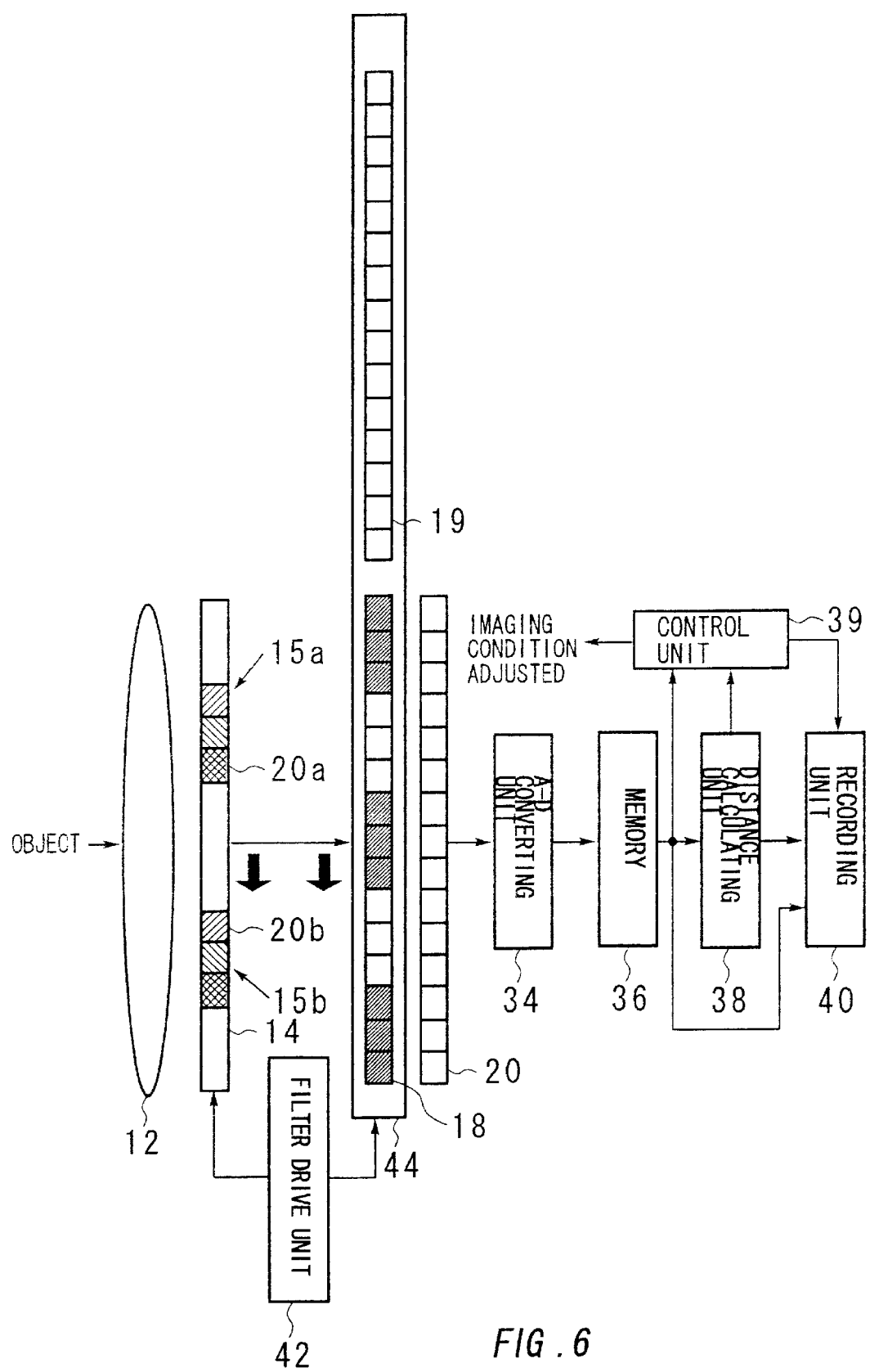
FIG. 6 shows a configuration of a camera according to the second embodiment of the present invention.

FIG. 6 shows a configuration of a camera according to the second embodiment of the present invention. The camera according to the present embodiment comprises: an optical image forming unit 12; a light passing portion 14; a light receiving unit 20; a light receiving portion optical filter tray 44; a filter drive unit 42; an A-D converting unit 34; a memory 36; a distance calculating unit 38; a control unit 39; and a recording unit 40.

The optical image forming unit 12, light receiving unit 20, A-D converting unit 34, memory 36, distance calculating unit 38, control unit 39 and recording unit 40 in FIG. 6 are same as those in the first embodiment, thus description thereof is omitted here.

The light receiving portion optical filter tray 44 includes a light receiving portion specific wavelength component transmitting filter 18 and a color filter 19. The first opening 15a and second opening 15b of the light passing portion 14 have opening specific wavelength component transmitting filter 22a and 22b, respectively.

The light passing portion 14 and the light receiving portion optical filter tray 44 can be simultaneously moved by the filter drive unit 42. When imaging the stereoscopic image of the object, the filter drive unit 42 moves the light passing portion 14 and the light receiving portion specific wavelength component transmitting filter 18 into within an optical path covered from the optical image forming unit 12 to the light receiving unit 20. In this manner, the camera can image the stereoscopic images of the object.

Moreover, when photographing (imaging) the object, the filter drive unit 42 moves the light passing portion 14 and the light receiving portion specific wavelength component filter 18 out of the optical path covered from the optical image forming unit 12 to the light receiving unit 20. Thereby, the camera can photograph (image) the image of the object.

The process in which the stereoscopic amount is detected from the stereoscopic image so as to calculate the distance distribution of the object is the same as that in the first embodiment, thus omitted here.

According to the present embodiment which differs from the first embodiment, both the stereoscopic image and the object can be imaged using the same optical image forming unit and the same light receiving unit. Thus, the common optical image forming unit and the light receiving unit are used in imaging the object as well as measuring the distance distribution of the object, so that the camera can be made compact-sized and also the cameras can be manufactured at a lower cost.

Third Embodiment

Figure 7:
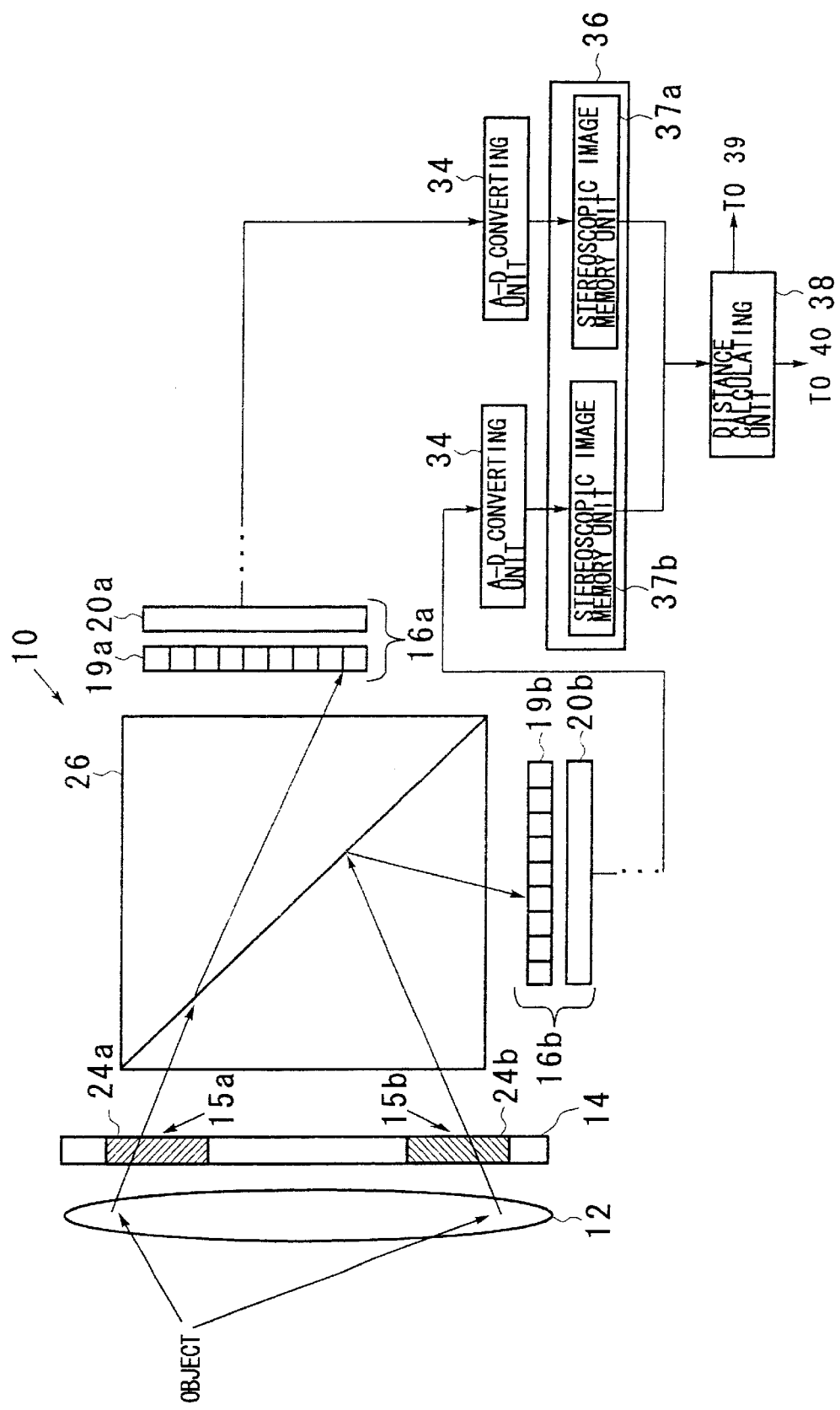
FIG. 7 shows a configuration of the stereoscopic imaging unit 10 of a camera according to the third embodiment.

FIG. 7 shows a configuration of the stereoscopic imaging unit 10 of a camera according to the third embodiment. In the camera according to the present embodiment, the stereoscopic imaging unit 10 in the first embodiment shown in FIG. 2 is replaced with the configuration shown in FIG. 7. Other structure is the same as that of FIG. 2, and the structure and operation common to those of FIG. 2 are omitted here.

Referring to FIG. 7, the stereoscopic imaging unit 10 comprises: an optical image forming unit 12 which image-forms the light of the object; a light passing portion 14 having the first and second openings which irradiate the light having passed the optical image forming unit 12; a polarization component separation unit 26 which separates a specific polarization component of the light; and imaging units 16a and 16b which image the object that is image-formed by the optical image forming unit 12.

The first opening 15a of the light passing portion 14 includes an opening specific polarization component transmitting filter 24a (as an exemplary opening optical filter) which transmits the light having a polarization plane of the horizontal direction, and the second opening 15b includes an opening specific polarization component transmitting filter 24b (as an exemplary opening optical filter) which transmits the light having a polarization plane of the vertical direction.

As an example of the optical separation unit, the light having the horizontal polarization plane is passed through the optical path covered from the optical image forming unit 12 to the imaging unit 16, there is provided the polarization component separation unit 26 which reflects a specific polarization component of the light, so that the light having the polarization plane in the horizontal direction is imaged by the imaging unit 16a and the light having the polarization plane in the horizontal direction is imaged by the imaging unit 16b.

The imaging units 16a and 16b comprise, respectively: light receiving units 20a and 20b in which a plurality of light receiving elements are arranged; and color filters 19a and 19b which cover the surface of the light receiving units 20a and 20b.

The first and second images which are photographed in the light receiving units 20a and 20b, respectively, are stored in the stereoscopic image memory units 37a and 37b, respectively via the A-D converting unit 34.

Since the operation of the distance calculating unit 38 in which the stereoscopic amount is detected from the stereoscopic image and the distance distribution of the object is calculated is the same as that in the first embodiment, description thereof is omitted here.

Fourth Embodiment

Figure 8:
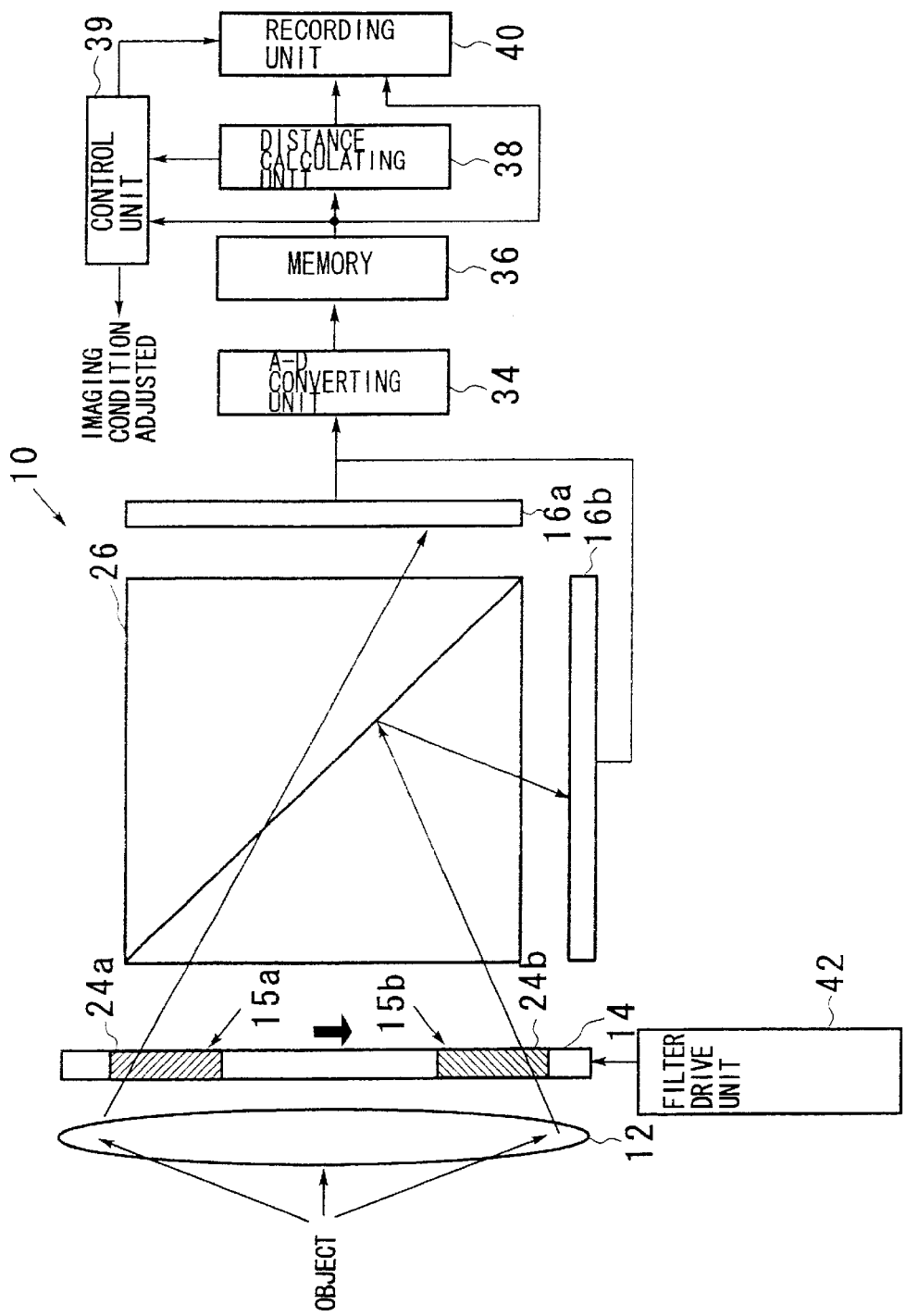
FIG. 8 shows a configuration of a camera according to the fourth embodiment of the present invention.

FIG. 8 shows a configuration of a camera according to the fourth embodiment of the present invention. The camera according to the present embodiment comprises: an optical image forming unit 12; a light passing portion 14; an imaging unit 16; a polarization component separation unit 26; a filter drive unit 42; an A-D converting unit 34; a memory 36; a distance calculating unit 38; a control unit 39; and a recoding unit 40.

In FIG. 8, the optical image forming unit 12, light passing portion 14, A-D converting unit 34, memory 36, distance calculating unit 38, control unit 39 and recording unit 40 are the same as those of the first embodiment, so that description thereof is omitted here, Moreover, the imaging units 16a and 16b given the same reference numerals as in FIG. 7 are the same as those in the third embodiment, so that description thereof is omitted here.

The first and second openings 15a and 15b of the light passing portion 14 include opening specific polarization component transmitting filters 24 an and 24b, respectively.

The filter drive unit 42 can move the light passing portion 14. When imaging the stereoscopic image, the first drive unit 42 moves the light passing portion 14 within the optical path covered from the optical image forming unit 12 to the imaging unit 16.

Moreover, when imaging the object, the filter drive unit 42 moves the optical pass portion 14 out of the optical pass covered from the optical image forming unit 12 to the imaging unit 16. In this manner, the camera can photograph the image of the object.

The operation of the distance calculating unit 38 in which the stereoscopic amount is detected from the stereoscopic images and the distance distribution of the object is calculated is the same as in the first embodiment, and description thereof is omitted here.

According to the present embodiment which is different from the third embodiment, the stereoscopic images and the object can be imaged using the same optical image forming unit, polarization component separation unit and the same image unit. Therefore, by utilizing the commonly used optical image forming unit and the light receiving unit when imaging the object and measuring the distance distribution of the object, the camera can be made compact-sized and the cameras can be produced at a lower cost.

Fifth Embodiment

Figure 9:
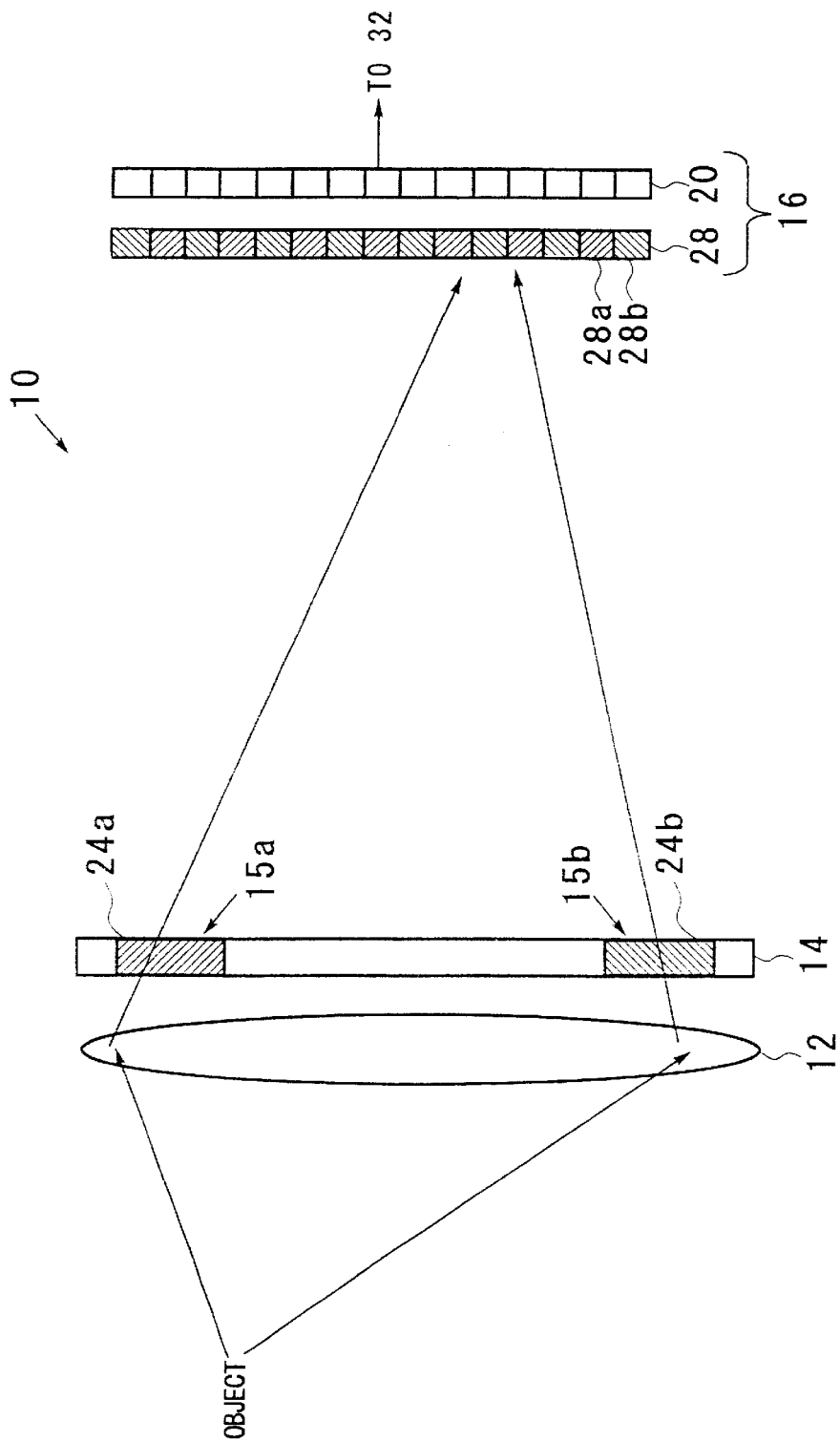
FIG. 9 shows a structure of the stereoscopic imaging unit 10 for a camera according to the fifth embodiment of the present invention.

FIG. 9 shows a structure of the stereoscopic imaging unit 10 for a camera according to the fifth embodiment of the present invention. In the camera of the present embodiment, the stereoscopic imaging unit 10 shown in FIG. 2 (first embodiment) is replaced with a structure shown in FIG. 9, and other constituents are the same as those shown in FIG. 2, so that the structures of the common parts and operations thereof are omitted here.

Referring to FIG. 9, the stereoscopic imaging unit 10 comprises: an optical image forming unit 12 which image-forms the light of the object; a light passing portion 14 having the first and second openings which irradiates to the imaging unit 16 the light having passed the optical image forming unit 12; and an imaging unit 16 which images (photographs) the object which is image-formed by the optical image forming unit 12.

The first opening 15a of the light passing portion 14 includes an opening specific polarization component transmitting filter 24a which transmits the light having a polarization plane of the horizontal direction, while the second opening 15b includes an opening specific polarization component transmitting filter 24b which transmits the light having a polarization plane of the vertical direction.

The imaging unit 16 includes a light receiving unit 20 and a light receiving portion specific polarization component transmitting filter 28 as an exemplary light receiving portion optical filter which covers the surface of the light receiving unit 20.

The light receiving portion specific polarization component transmitting filter 28 includes a light receiving portion horizontal polarization component transmitting filter 28a which transmits the light having the polarization plate in the horizontal direction; and a light receiving portion horizontal polarization component transmitting filter 28b which transmits the light having polarization plane in the vertical direction.

As a method for arranging the horizontal polarization component transmitting filter 28a and the vertical polarization component transmitting filter 28b, it suffices that respective filters be arranged in an evenly distributed manner without deviation.

The operation in which the stereoscopic amount is detected from the stereoscopic images and the distance distribution of the object is calculated is the same as in the first embodiment, so that description thereof is omitted here.

Sixth Embodiment

Figure 10:
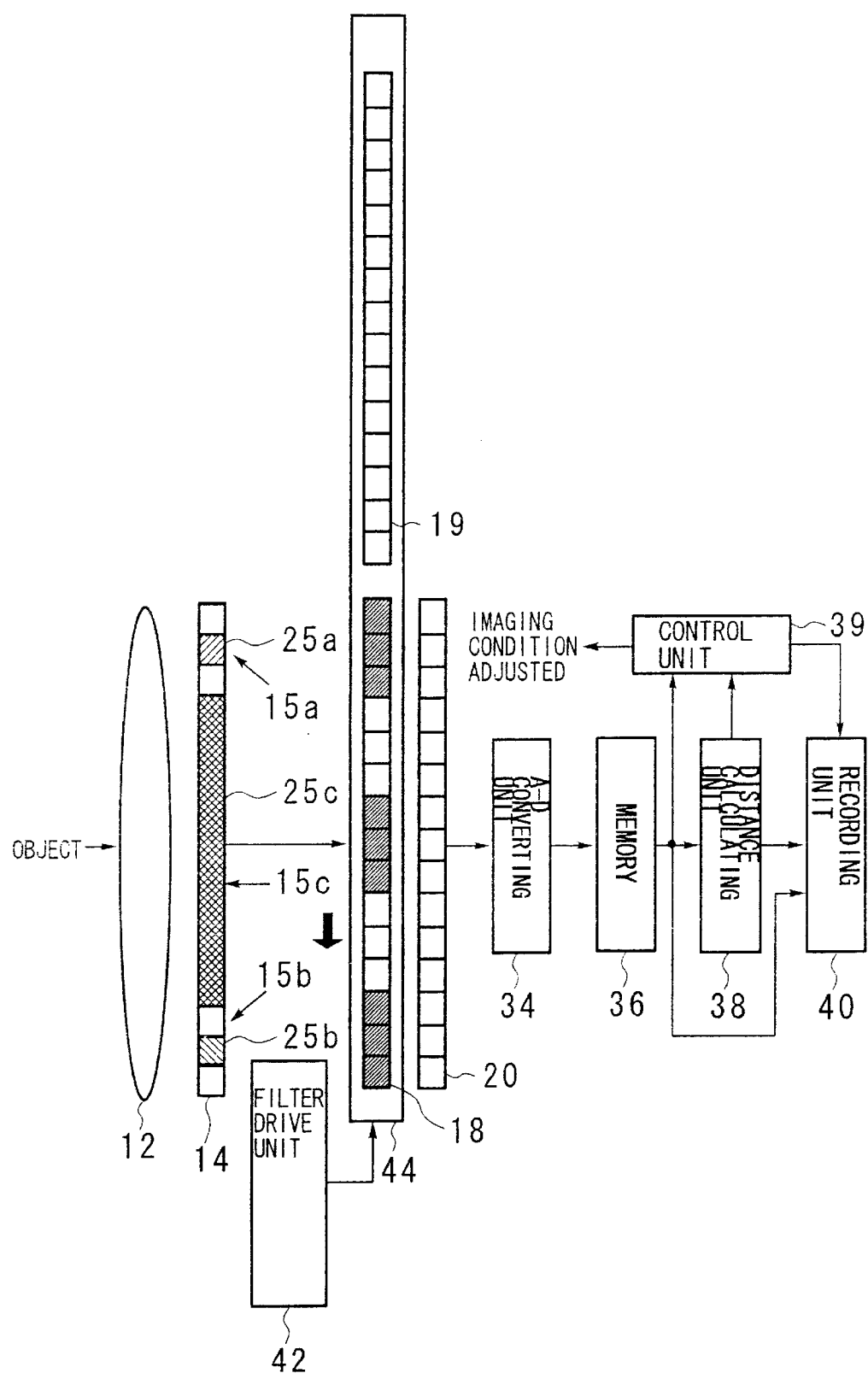
FIG. 10 shows a structure of the camera according to the sixth embodiment of the present invention.

FIG. 10 shows a structure of the camera according to the sixth embodiment of the present invention. The camera according to the present embodiment comprises: an optical image forming unit 12; a light passing portion 14; a light receiving unit 20; a light receiving portion optical filter tray 44; a filter drive unit 42; an A-D converting unit 34; a memory 36; a distance calculating unit 38; a control unit 39; and a recording unit 40.

In FIG. 10 the optical image forming unit 12, light receiving unit 20, A-D converting unit 34, memory 36, distance calculating unit 38, control unit 39 and recording unit 40 are the same as those in the first embodiment, so that description thereof is omitted here. Moreover, the light receiving portion optical filter tray 44 which is given the same reference numeral as in FIG. 6 is the same as in the second embodiment, so that description thereof is omitted here.

The light passing portion 14 is an LCD (liquid crystal display) optical shutter including the first, second and third openings 15a, 15b and 15c. The transmission and shielding of the light can be electrically switched at the openings by the electro-optic effect.

The first and second openings 15a and 15b include respective LCD optical shutters having specific wavelength component transmitting filters 25a and 25b which transmit different wavelength components, so that transmission and the shielding of the light are electrically switched and the openings can be freely opened or closed.

The third opening 15c includes an LCD optical shutter 25c which does not have a specific wavelength component transmitting filter, and which electrically switches the transmission and shielding of the light, so that the opening can be freely opened or closed.

The filter drive unit 42 can move a light receiving portion optical filter tray. When imaging (photographing) a stereoscopic image of the object, the filter drive unit 42 moves the light receiving portion specific wavelength component transmitting filter 18 within the optical path covered from the optical image forming unit 12 to the light receiving unit 20, so that the light passing portion 14 electrically opens the first and second openings 15a and 15b and electrically closes the opening 15c. Thereby, the camera can image the stereoscopic image.

Moreover, when imaging (photographing) the object, the filter drive unit 42 moves the light receiving specific wavelength component transmitting filter 18 out of the optical path covered from the optical image forming unit 12 to the light receiving unit 20, and moves the usual color filter 19 within the optical path, so that the light passing portion electrically opens the third opening and electrically closes the openings 15a and 15b. Thereby, the camera can image (photograph) an image of the object.

The process in which the stereoscopic amount is detected from the stereoscopic image and the distance distribution of the object is calculated is performed in the same manner as that in the first embodiment, so that description thereof is omitted here.

By implementing the sixth embodiment, the stereoscopic image as well as the object can be imaged utilizing the same optical image forming unit and the light receiving unit, without moving the light passing portion 14 out of the optical path covered from the optical image forming unit to the imaging unit. Therefore, in the course of imaging the object and measuring the distance distribution of the object, the camera can be made compact-sized and the camera can be produced at a lower cost as a result of utilizing the optical image forming unit, light passing portion and light receiving unit which are all commonly used throughout.

Seventh Embodiment

Figure 11:
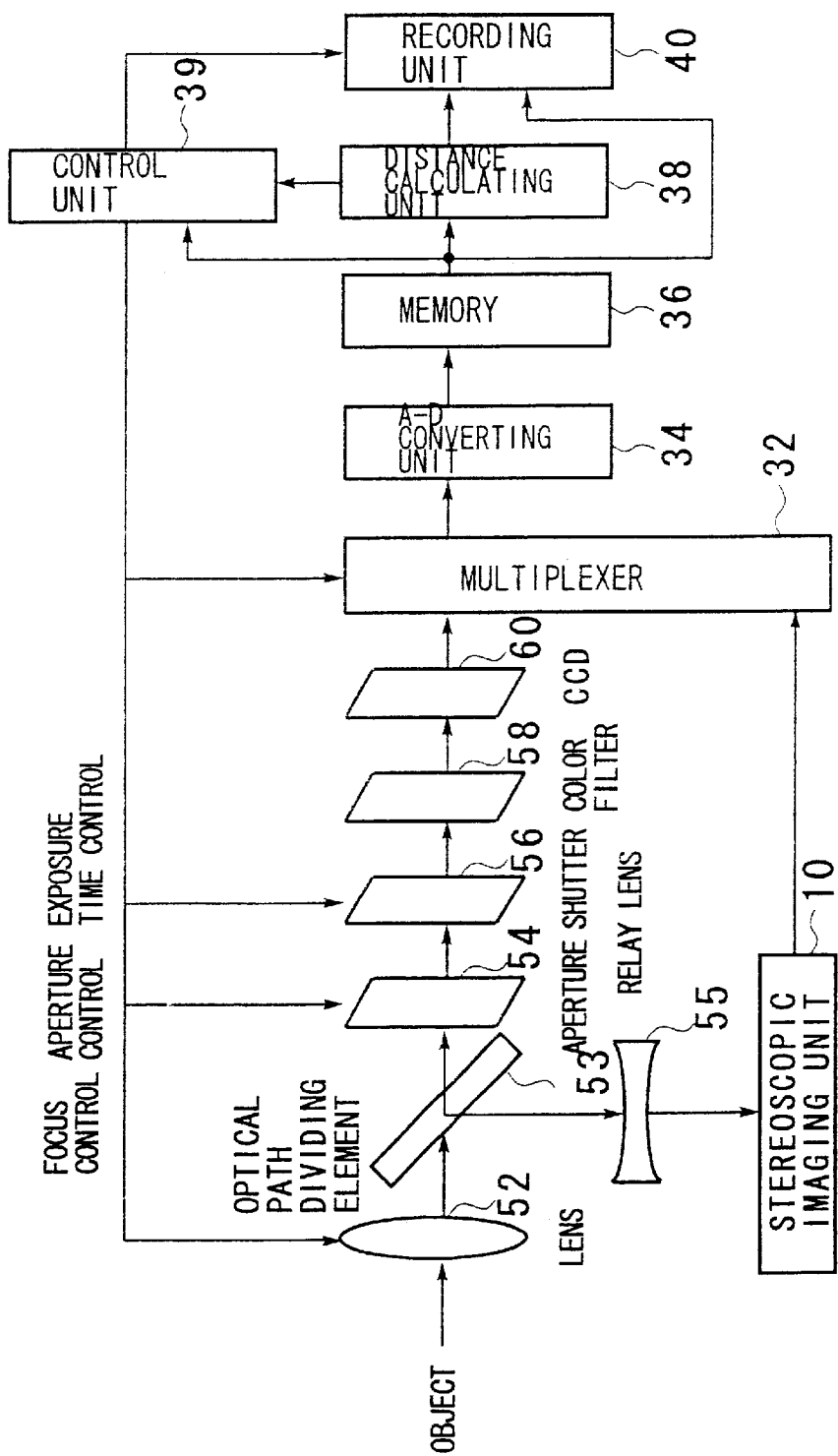
FIG. 11 shows a structure of a camera according to the seventh embodiment of the present invention.

FIG. 11 shows a structure of a camera according to the seventh embodiment of the present invention. The camera according to the seventh embodiment comprises: a stereoscopic imaging unit 10; a lens 52; an optical path dividing element 53; an aperture diaphragm 54; a relay lens 55; a shutter 56; a color filter 58; a CCD 60; a multiplexer 32; an A-D converting unit 34; a memory 36; a distance calculating unit 38; a control unit 39; and a recording unit 40.

The lens 52, aperture diaphragm 54, shutter 56, A-D converting unit 34, memory 36, distance calculating unit 38, control unit 39 and recording unit 40 which are given the same reference numerals in FIG. 11 as in FIG. 2 are the same as those in the first embodiment, so that description thereof is omitted here.

The camera of the present embodiment image-forms the object using the lens 52. The optical path diving element 53 divides the optical path of the light having passed the lens 52, so that the light is divided into (1) the light which is received by the CCD 60 via the shutter 56 and color filter 58, and (2) the light which is input to the stereoscopic imaging unit 10 via the relay lens 55.

The stereoscopic imaging unit 10 in this seventh embodiment may be the stereoscopic imaging unit 10 depicted in the first embodiment, third embodiment or the fifth embodiment. The image of the object which is image-formed by the lens 52 is input to the stereoscopic imaging unit 10 via the relay lens 55. The structure and operation of the stereoscopic imaging unit 10 has been described already, so that description thereof is omitted here.

The process in which the stereoscopic amount is detected from the stereoscopic image and the distance distribution of the object is calculated so as to control the imaging condition of the camera is the same as that in the first embodiment, thus description thereof is omitted here.

The relay lens 55 may be a contraction relay system which contracts an image, and the stereoscopic imaging unit 10 may be comprised of a compact-sized optical system and a light receiving unit. On the other hand, the CCD 60 which receives the image of the object may be high-definition one that contains a huge number of pixels. Configured in this manner, the lens 52 is commonly used and the object's image having a high resolution can be image-formed in the CCD 60 while the object's stereoscopic image having a low resolution can be imaged in the stereoscopic imaging unit 10.

By implementing the camera of the present embodiment, the object as well as the stereoscopic image can be photographed (imaged) utilizing the image of the object which is image-formed by the lens 52. The lens which image-forms the object is commonly used, so that the camera can be made compact-sized and the cost for producing the cameras can be significantly lowered.

Eighth Embodiment

Figure 12:
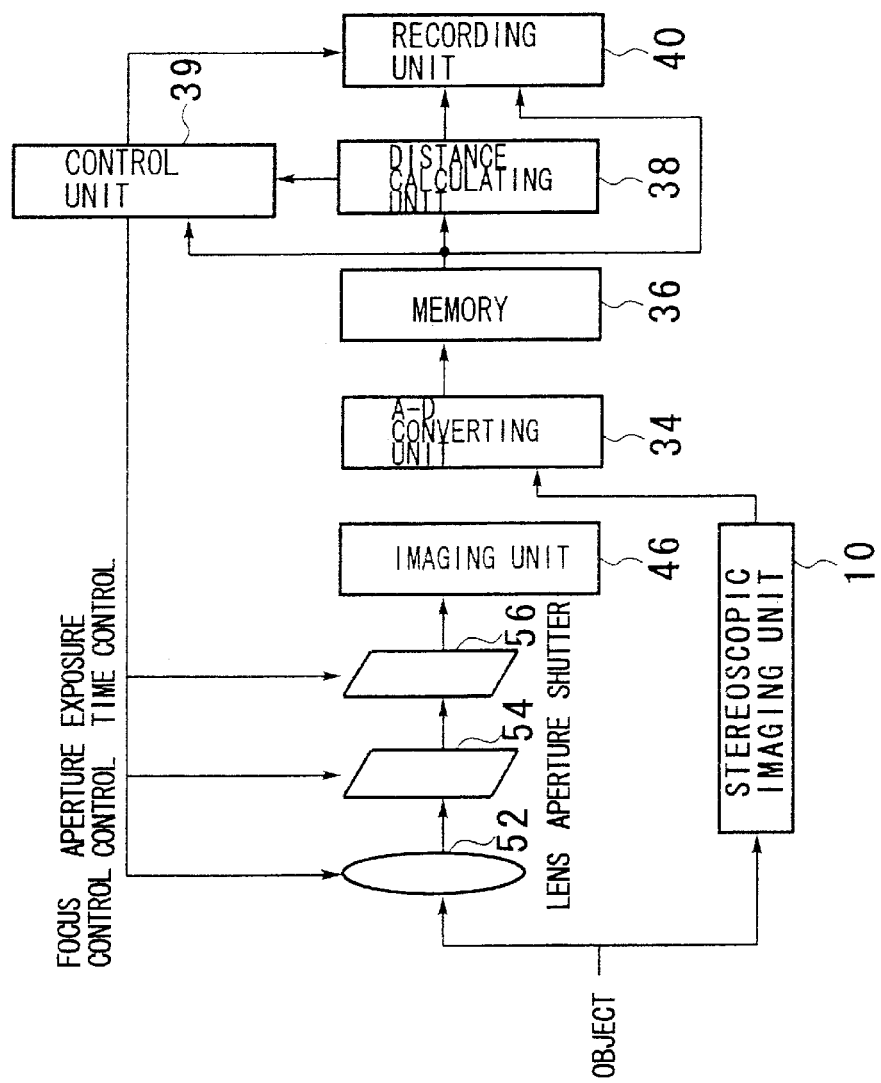
FIG. 12 is a structure of a camera according to the eighth embodiment of the present invention.

FIG. 12 is a structure of a camera according to the eighth embodiment of the present invention. The camera of the eighth embodiment comprises: a stereoscopic imaging unit 10; a lens 52; an aperture diaphragm 54; a shutter 56; an imaging unit 46; an A-D converting unit 34; a memory 36; a distance calculating unit 38; a control unit 39; and a recording unit 40.

The lens 52, aperture diaphragm, shutter 56, A-D converting unit 34, memory 34, distance calculating unit 38, control unit 39 and recording unit 40 in FIG. 12 which are given the same reference numerals as in FIG. 2 are the same as those in the first embodiment, so that description thereof is omitted here.

The stereoscopic imaging unit 10 in this eighth embodiment may be the stereoscopic imaging unit 10 depicted in the first embodiment, third embodiment or the fifth embodiment. The image of the object which is image-formed by the lens 52 is input to the stereoscopic imaging unit 10 via the relay lens 55. The structure and operation of the stereoscopic imaging unit 10 has been described already, so that description thereof is omitted here.

In the imaging unit 46 the image is imaged on the silver salt photosensitive film and so on by the photoreaction.

The process in which the stereoscopic amount is detected from the stereoscopic image and the distance distribution of the object is calculated so as to control the imaging condition of the camera is the same as that in the first embodiment, thus description thereof is omitted here.

According to the camera of the present embodiment, the distance distribution of the object is acquired and the imaging conditions such as the focusing, aperture amount and exposure time and so on are properly adjusted based on the distance distribution data, so that the image of the object can be photographed on the silver salt photosensitive film or the like.

Ninth Embodiment

Figure 13:
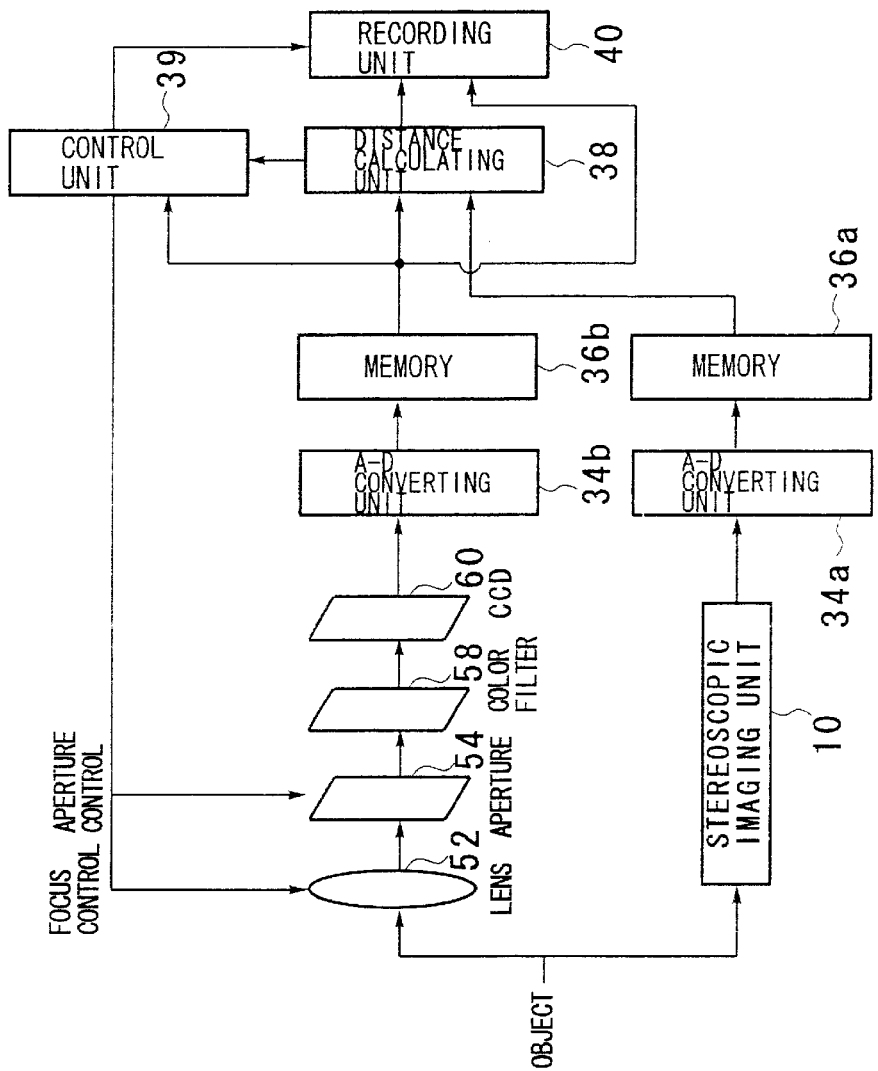
FIG. 13 shows a structure of a camera according to the ninth embodiment of the present invention.

FIG. 13 shows a structure of a camera according to the ninth embodiment of the present invention. The camera of the present invention is a video camera which images moving pictures, and comprises: a stereoscopic imaging unit 10; a lens 52; an aperture 54; a color filter 58; a CCD 60; A-D converting units 34a and 34b; memories 36a and 36b; a distance calculating unit 38; a control unit 39; and a recording unit 40.

The lens 52, aperture 54, color filter 58, CCD 60, A-D converting units 34a and 34b, memories 36a and 36b, distance calculating unit 38, control unit 39 and recording unit 40 in FIG. 13 which are given the same reference numerals as in FIG. 2 operate in the same manner as in the first embodiment, so that description thereof is omitted here.

The stereoscopic imaging unit 10 in this ninth embodiment may be the stereoscopic imaging unit 10 depicted in the first embodiment, third embodiment or the fifth embodiment. The stereoscopic image photographed (imaged) by the stereoscopic imaging unit 10 is stored in the memory 36a. The distance calculating unit 38 reads the stereoscopic image from the memory 36a, so as to detect the stereoscopic amount and calculate the distance distribution of the object. The object's image which is image-formed by the lens 52 is received by the CCD 60 so as to be stored in the memory 36b. The photographed object's image is stored in the recording unit 40. A video tape, MO or DVD and the like may serve as the recording unit 40.

Tenth Embodiment

Figure 14:
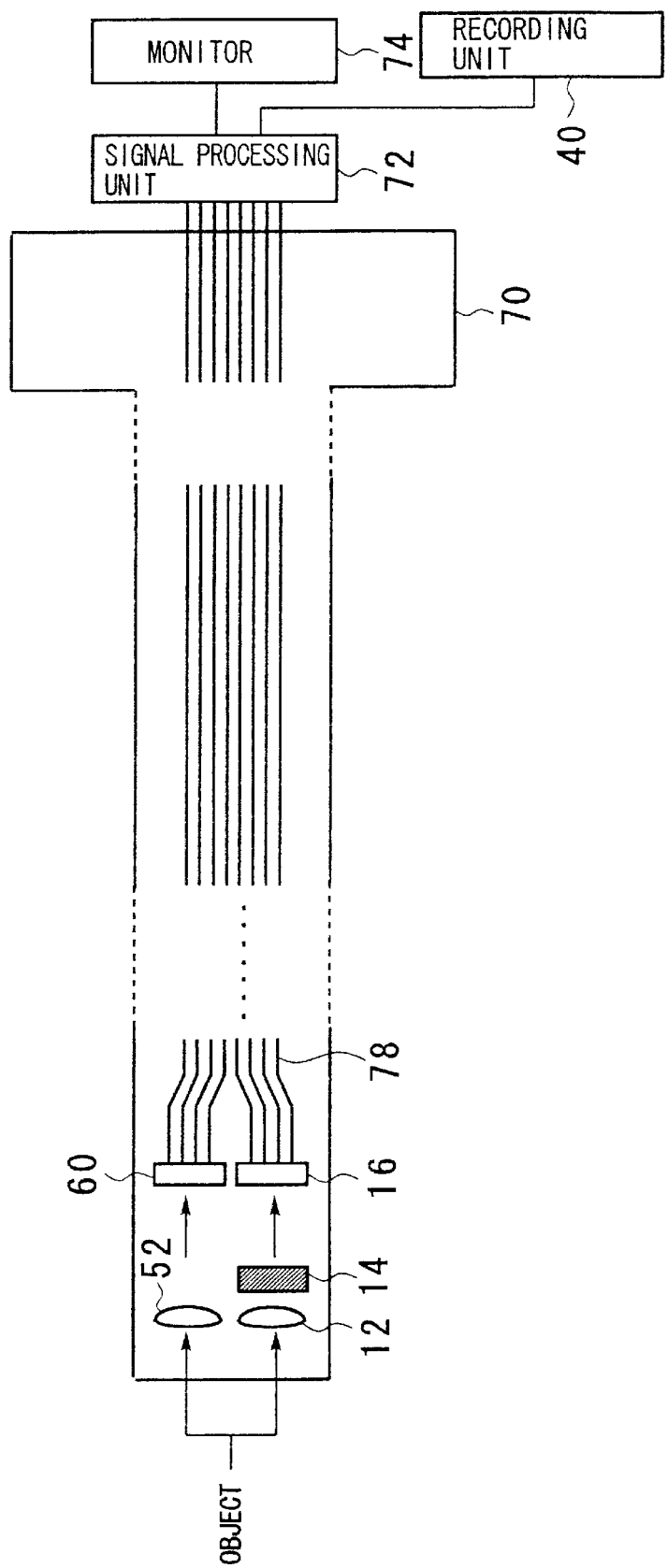
FIG. 14 shows a structure of a camera according to the tenth embodiment.

FIG. 14 shows a structure of a camera according to the tenth embodiment. The camera of the present embodiment is an endoscopic device which gives a view of stomach and gut for the purpose of diagnosis and cure. In order to observe the fine asperities of the wall surfaces of the internal organ, it is important to extract data relating to the depth of the object. The endoscopic device of the present embodiment images the object while acquiring the distance distribution data of the object by imaging the stereoscopic image.

The endoscopic device of the present embodiment comprises: an endoscope 70; a signal processing unit 72; a recording unit 40; and a monitor 74. The tip portion of the endoscope 70 according to the present embodiment comprises: a lens 52; a CCD 60; an optical image forming unit 12; a light passing portion 14; a imaging unit 16, so that the stereoscopic image is image-formed.

Inside the cylinder of the endoscope 70 there is provided a transmission cable 78 through which the output electric signals of the CCD 60 and imaging unit 16 are transferred. The structure of the optical image forming unit 12, light passing portion 14 and imaging unit 16 for imaging the stereoscopic image may be of the stereoscopic imaging unit 10 according to the first, third or fifth embodiment.

The signal processing unit 72 processes the images imaged by the CCD 60 and the imaging unit 16. The signal processing unit 72 detects the stereoscopic amount from the stereoscopic image and calculates the distance distribution data of the object, so that image processing is performed on the image of the object so as to be output to the monitor 74 and the recording unit 40. Namely, the signal processing unit 72 outputs the processed image to the monitor 74.

The monitor 74 displays the image of the object together with the distance data. Moreover, monitor 74 may display a stereoscopic or stereographic image of the object.

Though the CCD 60 and the imaging member 16 are provided in the tip portion of the endoscope in the present embodiment, the present embodiment is not limited thereto. The CCD 60 and the imaging member 16 may be provided in the rear portion of the endoscope, and a plurality of relay lenses may be provided inside the cylinder of the endoscope 70, so that the image which is image-formed by the lens 52 and the optical image forming unit 12 may be imaged by the CCD 60 and the imaging member 16 in the rear portion of the endoscope via the relay lens.

According to the endoscopic device of the present embodiment, the object can be imaged while measuring the distance distribution data of the object, and the fine asperities of the wall surfaces of the internal organ can be observed.

According to the above present embodiments, a plurality of the stereoscopic images while the objects are viewed from the different points, are simultaneously imaged, so that the stereoscopic amounts for a plurality of stereoscopic images can be detected so as to acquire the depth data of the object.

Eleventh Embodiment

Figure 15:
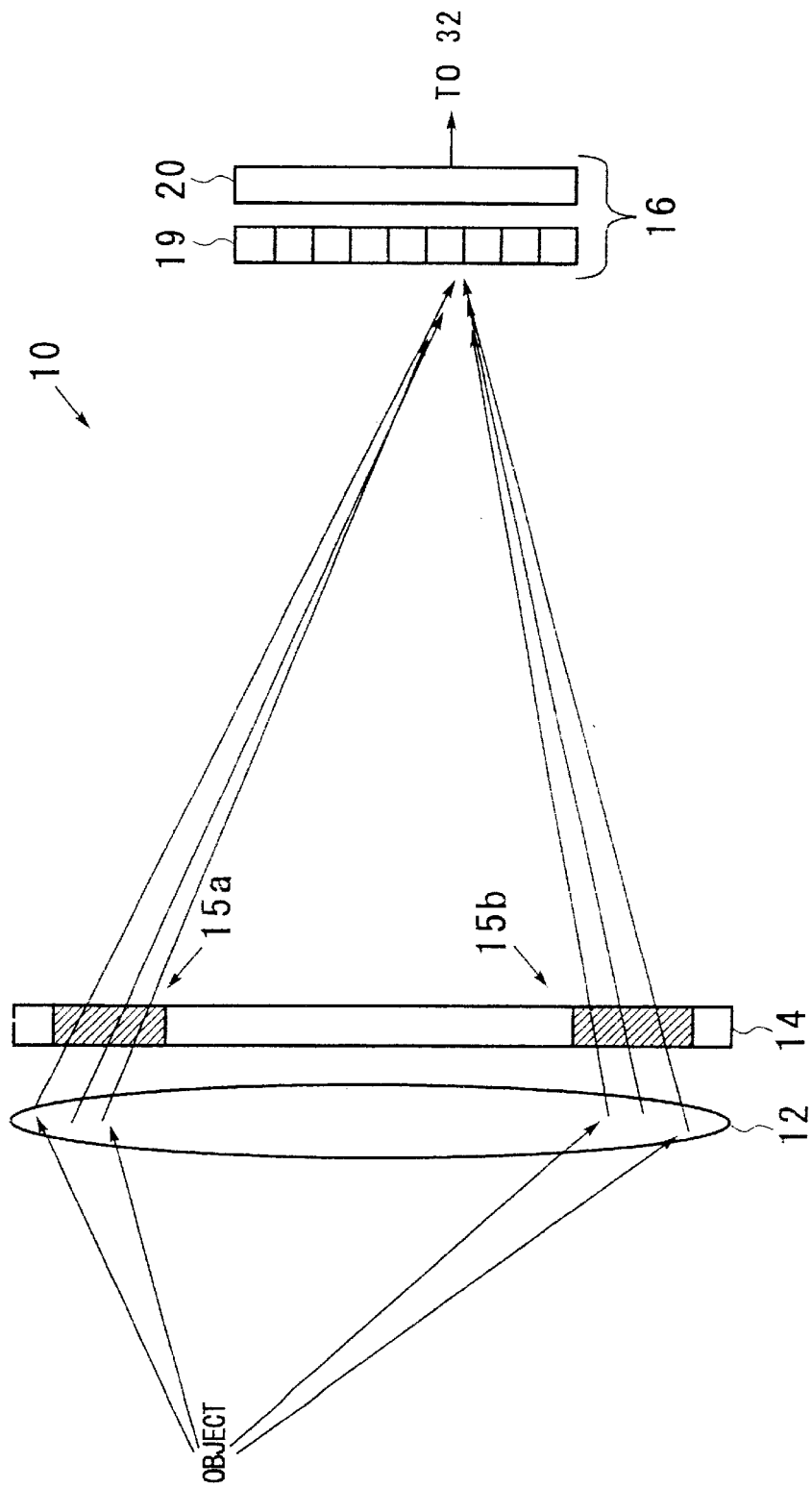
FIG. 15 shows a structure of the stereoscopic imaging unit 10 according to the eleventh embodiment.

FIG. 15 shows a structure of the stereoscopic imaging unit 10 according to the eleventh embodiment. The stereoscopic imaging unit 10 comprises: an optical image forming unit 12 which image-forms the light of the object; a light passing portion 14 including a first opening 15a and a second opening 15b which irradiate to the imaging unit 16 the light having passed through the optical image forming unit 12; and an imaging unit 16 which images (photographs) the object that is image-formed by the optical image forming unit 12.

The image passing portion 14 is placed on the pupil plane of the optical image-forming unit 12, and the light passes through the first opening 15a and second opening 15b while the light is shielded off in portions other than the first and second openings 15a and 15b.

In the imaging unit 16, a plurality of light receiving elements are arranged in the form of a matrix. The imaging unit 16 comprises a light receiving unit 20 in which the object is image-formed by the optical image-forming unit, and a color filter 18 which covers the front surface of the light receiving unit 20. The color filter 19 transmits the RGB components of the light, so that the light is received by the light receiving elements of the light receiving unit 20. The light receiving element of the light receiving unit 20 may be, for example, a photoelectric conversion element such as a CCD (charge-coupled device), so that the light receiving unit 20 may be a photoelectric conversion imaging member in which a plurality of CCD's are arranged. It is to be noted that the light receiving unit and the light receiving portion are interchangeably used throughout the specifications.

By implementing the stereoscopic imaging unit 10 according to the present embodiment, the first image having passed through the first opening 15a of the light passing portion 14 as well as the second image having passed through the second opening 15b can be simultaneously imaged in the light receiving unit 20. Therefore, in the light receiving unit 20 a double image is imaged where the stereoscopic images of the object viewed from the first opening 15a and the second opening 15b are overlapped to each other.

Figure 16:
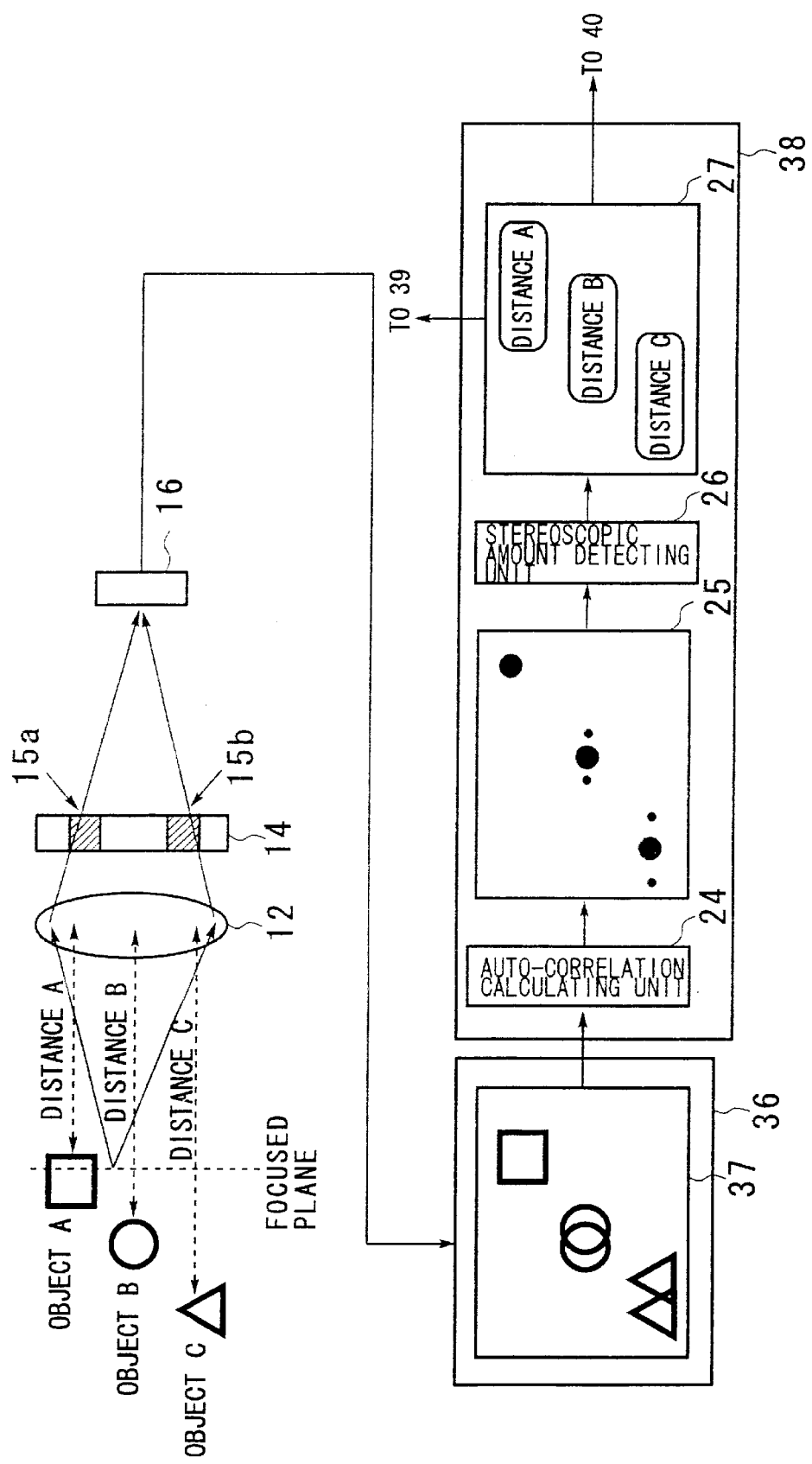
FIG. 16 shows a structure of the processing unit which processes the imaged stereoscopic images.

FIG. 16 shows a structure of the processing unit which processes the imaged stereoscopic images. The optical image forming unit 12, light passing portion 14 and imaging unit 16 in FIG. 15 which are given the same reference numerals are the same as those in FIG. 15, so that description thereof is omitted here and the memory 36 and the distance calculating unit 38 will be described. In FIG. 16, though the multiplexer and the A-D converting unit are omitted, in the actual operation the image which the imaging unit 16 photographed is sent to the A-D converting unit via the multiplexer, and is stored in the memory 36 after having been converted to the digital signal.

Referring to FIG. 16, the memory 36 stores the object's stereoscopic image 37 that the imaging unit 16 photographed. The distance calculating unit 38 comprises (1) an auto-correlation calculating unit 24 which calculates the autocorrelation on a specific region of the stereoscopic image, and (2) a stereoscopic amount detecting unit 26 which detects the stereoscopic amount of said stereoscopic image in the specific region based on the auto-correlation calculated by the auto-correlation calculating unit 24, calculates distance from the object to the specific region and outputs the distance distribution data of the object as a whole.

In what to follow, suppose that stereoscopic images for objects A, B and C are photographed. Then, the operations of the memory 36, auto-correlation calculating unit 24 and the stereoscopic amount calculating unit 26 will be described.

The memory 36 stores stereoscopic image 37 of the objects A,B and C. The stereoscopic image 37 is the double image of the objects A,B and C.

The auto-correlation calculating unit 24 reads the stereoscopic image 37 out of the memory 36, calculates, in a manner described later, the auto-correlation on respective specific regions where the stereoscopic image of the objects A, B and C are imaged, and outputs the auto-correlation data 25 of the whole object which store auto-correlation values on respective regions in which the stereoscopic image of the objects A, B and C are imaged.

The stereoscopic amount detecting unit 26 calculates the stereoscopic amount on respective specific regions where the double image of the objects A,B and C are photographed, based on the auto-correlation values that the auto-correlation calculating unit 24 calculated. Since the distance between the openings 15a and 15b of the light passing portion 14, the distance between the optical image forming unit 12 and the imaging unit 16 and the focal length of the optical image forming unit 12 are known, the stereoscopic amount detecting unit 26 can calculate the distance A, distance B and distance C between the optical image forming unit 12 to the objects A, B and C by utilizing the lens formula based on the respective stereoscopic amounts of the objects A,B, and C. The stereoscopic amount detecting unit 26 outputs the distance distribution data 27 of the whole subject which store the distance A, distance B and distance C.

Figure 17:
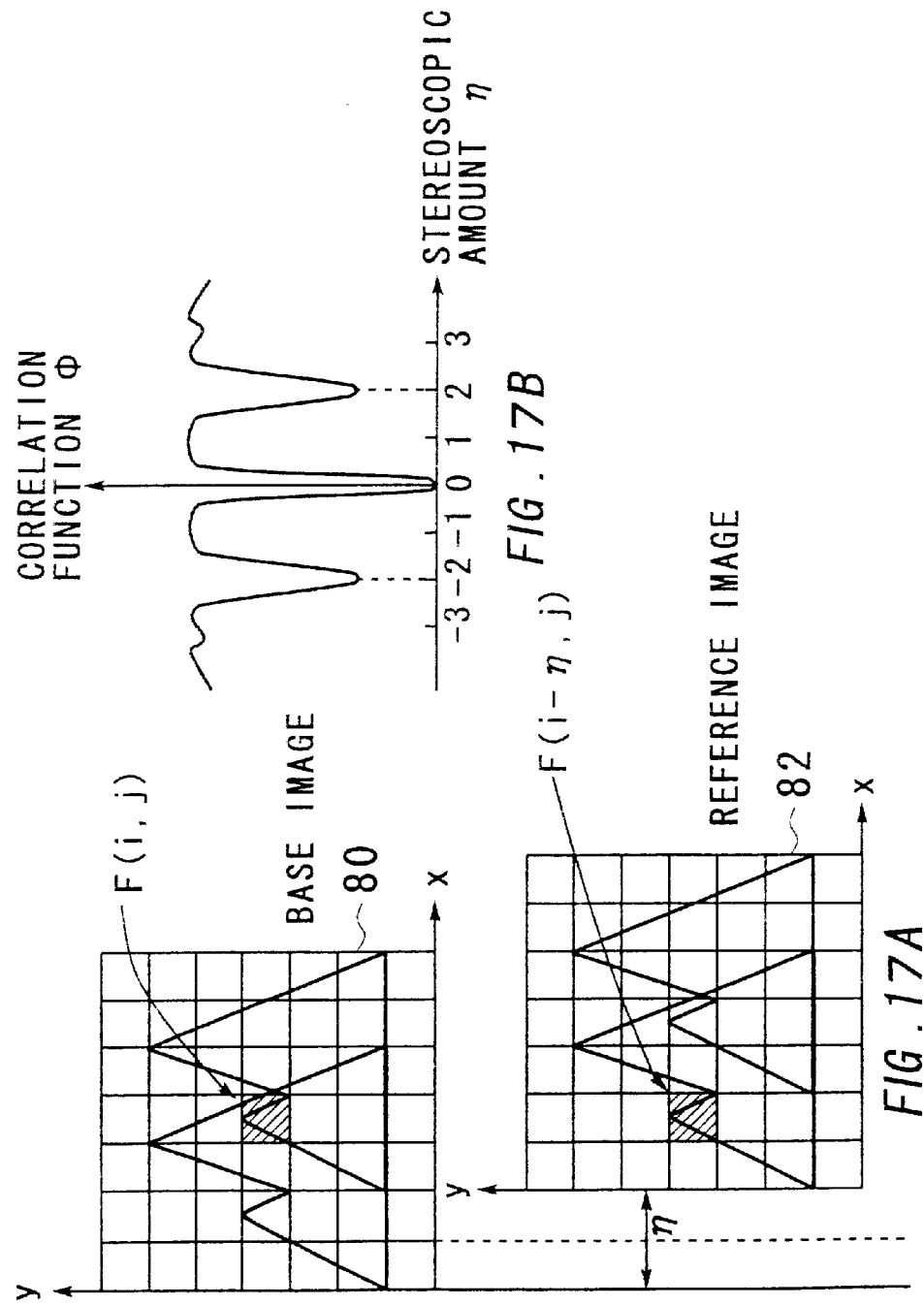
FIGS. 17A and 17B explain the calculating methods for calculating the auto-correlation and stereoscopic amount.

FIGS. 17A and 17B explain the calculating methods for calculating the auto-correlation and stereoscopic amount. Referring to FIG. 17A, in the specific region where the double image of the object is imaged, let an image of said specific region be a base image 80 and let an image be a reference image 82, in which the base image 80 is displaced by a certain fixed amount in the stereoscopic direction. The degree of similarity between the base image 80 and the reference image 82, that is so-called a correlation, represents an auto-correlation of base image 80 in terms of the displacement in the stereoscopic direction.

As an evaluation function serving to evaluate the correlation between the base image 80 and the reference image 82, there are available, for example, (1) the sum of square of difference of pixel data between the base image 80 and the reference image 82,
(2) the sum of absolute values of difference of pixel data between the base image 80 and the reference image 82, and
(3) an auto-correlation function which is normalized over the pixel data of the base image 80 and the reference image 82.

In what to follow, a case where the sum of square of the difference of the pixel data between the base image 80 and the reference image 82 serves as the evaluation function will be described.

Let the value of the pixel data (for example, the value of RGB of the light or a characteristic value such as brightness) in a coordinate (i, j) in the coordinate systems (x, y) of the base image 80 be F (i, j). Let an image in which the base image 80 is displaced by $\eta$ and $\xi$ in the x and y directions, respectively be the reference image 82. Then, the value of the pixel data of the reference image 82 which is to be compared to the value of the pixel data of the base image 89 (F(i, j)) is F(i–$\eta$, j–$\xi$).

A correlation function $\Phi$ ($\eta$, $\xi$) of the base image 80 and the reference image 82, where the base image 80 is displaced by $\eta$ and $\xi$ in the x and y directions, respectively, is given by the following equation.

$$\Phi(\eta, \xi) = \Sigma i \Sigma j [F(i, j) - F(i-\eta, j-\xi)]^2$$

where $\Sigma i \Sigma j$ indicates that the sum is taken over the specific region where the double image is photographed.

The less the value of the correlation function $\Phi(\eta, \xi)$ becomes, the stronger the correlation between the base image 80 and the reference image 82 becomes while the larger the value of the correlation function $\Phi(\eta, \xi)$ becomes, the weaker the correlation between the base image 80 and the reference image 82 becomes.

The correlation function $\Phi(\eta, \xi)$ takes a minimum value when $\eta=0$ and $\xi=0$. For the base image 80 matches the reference image 82 when $\eta=0$ and $\xi=0$. This is rather an obvious result.

Referring to FIG. 17B, when the correlation function $\Phi(\eta, \xi)$ is obtained in the order that the stereoscopic value($\eta$, $\xi$) is changed in the stereoscopic direction, the correlation function $\Phi(\eta, \xi)$ takes the local minima at a position where the base image 80 and the reference image 82 are displaced by exactly as much as the original double image is displaced, so that a somehow stronger correlation appears. Moreover, when the base image 80 and the reference image 82 are positioned in a relation other than the above, the correlation function $\Phi(\eta, \xi)$ takes on a large value, so that the correlation becomes weak. For, part of the base image 80 and reference image 82 match up when the reference image 82 is displaced from the base image 80 by as much as the displacement of the double image.

In this manner, since the value of the correlation function $\Phi(\eta, \xi)$ becomes the minima at the position where the base image 80 and the reference image 82 are displaced in either left or right (horizontal) direction by as much as the double image is displaced, the stereoscopic amount of the base image 80 and the reference image 82 can be obtained by detecting the stereoscopic value ($\eta$, $\xi$) at which the correlation function $\Phi(\eta, \xi)$ takes on the minima.

While the stereoscopic value ($\eta$, $\xi$) is changed in the stereoscopic direction, the value of the correlation function $\Phi(\eta, \xi)$ is obtained in sequence, so that a pair ($\eta^*$, $\xi^*$) among ($\eta$, $\xi$) in which $\Phi(\eta, \xi)$ becomes a minima is obtained. Then, the stereoscopic amount $\xi$ is obtained by the following equation.

$$\xi = \sqrt{(\eta^{*2} + \xi^{*2})}$$

Now, if the first and second openings of the light passing portion 14 are provided in the x or y direction in the (x, y) coordinate systems of the light receiving unit, the stereoscopic direction suffices to be considered at either x or y direction only. Therefore, in this case, the stereoscopic amount $\xi = \eta^*$ or $\xi = \xi^*$.

Though explanation has been made in a manner that the two image data such as the base image 80 and the reference image 82 are compared to each other for the sake of convenience, the two data are not necessary in the actual calculation of the correlation function $\Phi(\eta, \xi)$. It suffices to substitute the pixel data F(i, j) and F(i–$\eta$, j–$\xi$) into the above correlation function $\Phi(\eta, \xi)$ against a fixed stereoscopic value ($\eta$, $\xi$).

Moreover, in the above explanation, the specific region is regarded as the region of the double image of the object which is imaged on the predetermined pixel matrix, and the base image and the reference image 82 are introduced, so as to calculate the stereoscopic amount. However, the method for calculating the stereoscopic amount is not limited thereto. According to another embodiment, a region where the first image is photographed may be extracted from the double image of the object which is imaged on the predetermined pixel matrix, so that such the extracted region is regarded as the specific region. Then, the image may be displaced by a fixed stereoscopic value ($\eta$, $\xi$) and the correlation is calculated against the corresponding region on the predetermined pixel matrix so as to acquire the stereoscopic amount.

In this case, the correlation about the pixel data F(i, j) in the specific region and the pixel data F(i+$\eta$, j+$\xi$) in the corresponding region will be calculated. The correlation function $\Phi(\eta, \xi)$ will be expressed by the following equation.

$$\Phi(\eta, \xi) = \Sigma i \Sigma j \, [F(i, j) - F(i+\eta, j+\xi)]^2$$

where $\Sigma i \Sigma j$ indicates that the sum is taken over only the region where the first image is photographed.

Twelfth Embodiment

Figure 18:
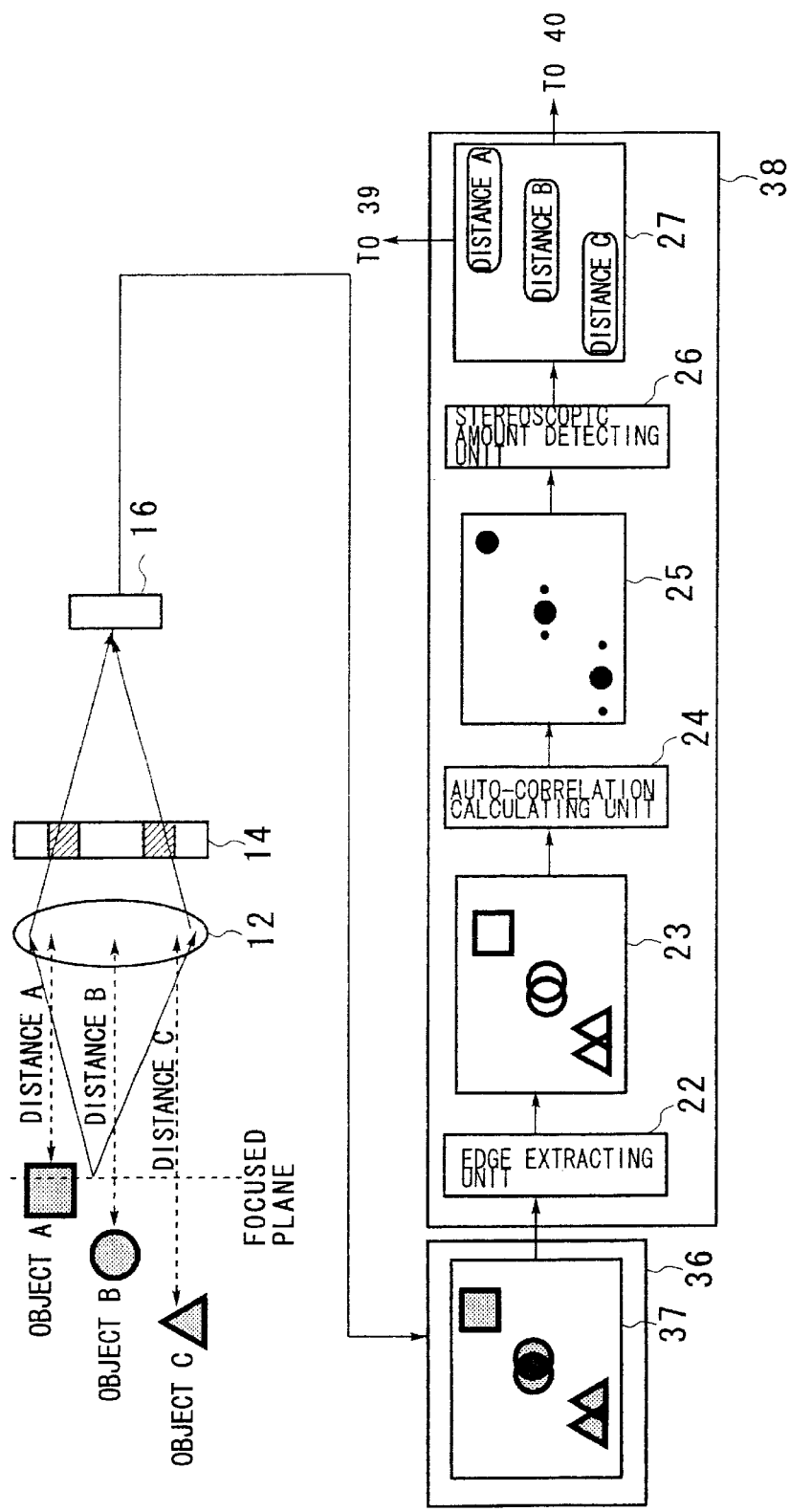
FIG. 18 shows a structure of a processing unit of the camera serving as an exemplary stereoscopic imaging apparatus according to the twelfth embodiment.

FIG. 18 shows a structure of a processing unit of the camera serving as an exemplary stereoscopic imaging apparatus according to the twelfth embodiment. In the camera according to the present embodiment, the structure of the distance calculating unit 38 of the camera in the eleventh embodiment is replaced with that of the distance calculating unit 38 shown in FIG. 18, and other parts are the same as in the eleventh embodiment, so the description of the same structure and operation is omitted here.

The twelfth embodiment differs from the eleventh embodiment in that a process in which an edge image is extracted from the stereoscopic image of the photographed object is performed, and the stereoscopic amount is detected based on the edge image.

Referring to FIG. 18, the distance calculating unit 38 comprises: an edge extracting unit 22; an auto-correlation calculating unit 24 which calculates auto-correlation on a specific region of the edge image; and a stereoscopic amount detecting unit 26 which detects a stereoscopic amount of the specific region of said stereoscopic image from the auto-correlation calculated by the auto-correlation calculating unit 24, calculates a distance to the specific region of the object and outputs the distance distribution data of the whole object.

In what is to follow, suppose that stereoscopic images for objects A,B and C are photographed. Then, the operations of the memory 36, edge extracting unit 22, auto-correlation calculating unit 24 and stereoscopic amount detecting unit 26 will be described.

The memory 36 stores a stereoscopic image 37 of the objects A, B and C. The stereoscopic image 37 is the double image of the objects A, B and C.

The edge extracting unit 22 reads the stereoscopic image 37 out of the memory 36, performs an image processing on respective regions where the double images of the objects A,B and C are photographed in order to detect a boundary between the object and a background so as to extract the edges, and outputs an edge image 23 of the whole object.

The auto-correlation calculating unit 24 calculates, based on the edge image 23, the auto-correlation on respective regions where the stereoscopic image of the objects A, B and C are imaged, and outputs the auto-correlation data 25 of the whole object. Here, the auto-correlation data 25 stores auto correlation values on respective regions in which the stereoscopic image of the objects A, B and C are imaged.

The stereoscopic amount detecting unit 26 calculates the stereoscopic amount on respective specific regions where the double image of the objects A,B and C are photographed, from the auto-correlation values that the auto-correlation calculating unit 24 calculated, and outputs the distance distribution data 27 of the whole object.

The process of obtaining the auto-correlation value, the process of detecting the stereoscopic amount from the auto-correlation value and the process of extracting the distance distribution data of the whole object from the stereoscopic amount are the same as in the eleventh embodiment, so a description thereof is omitted here.

In general, the extracted stereoscopic image contains unwanted image data such as the color and marking of the object, in addition to the contour of the object. When evaluating the correlation from the values of the pixel data, data other than the contour are possibly a factor to cause a noise. By implementing the present embodiment, the correlation can be calculated from the stereoscopic amount of the object consisting of edges once the edges of the stereoscopic images of the object are extracted. Thus, even if the image data contain data other than the contour of the object, the correlation of the stereoscopic image can be obtained reliably, so that the distance distribution of the object can be calculated based on the precise stereoscopic amount.

Thirteenth Embodiment

Figure 19:
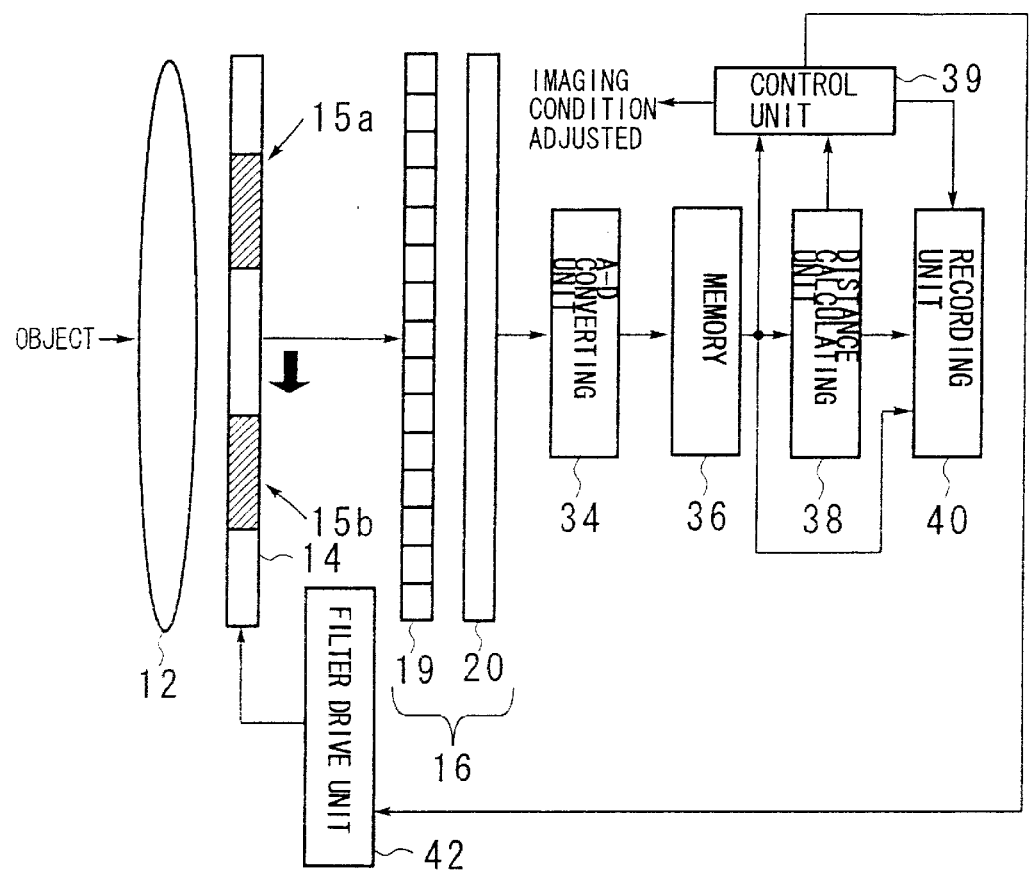
FIG. 19 shows a structure of a camera exemplifying a stereoscopic imaging apparatus according to the thirteenth embodiment.

FIG. 19 shows a structure of a camera exemplifying a stereoscopic imaging apparatus according to the thirteenth embodiment. The camera of the present embodiment comprises: an optical image forming unit 12; a light passing portion 14; a color filter 19; a light receiving unit 20; a filter drive unit 42; an A-D converting unit 34; a memory 36; a distance calculating unit 38, a control unit 39; and a recording unit 40.

The optical image forming unit 12, light passing portion 14, color filter 19, light receiving unit 20, A-D converting unit 34, memory 36, distance calculating unit 38 and recording unit 40 in FIG. 19 are the same as in the first embodiment (the eleventh embodiment), so a description thereof is omitted here. The control unit 39 is the same as that in the first embodiment (the eleventh embodiment) except where the control unit 39 controls the filter drive unit 42, so a description thereof is omitted here.

The filter drive unit 42 can move the light passing portion 14. The control unit 39 controls the filter drive unit 42 so as to perform a desired operation.

When imaging the stereoscopic image of the object, the filter drive unit 42 moves the light passing portion 14 within an optical path covering from the optical image forming unit 12 to the light receiving unit 20. Thereby, the camera can image the stereoscopic images of the object.

Moreover, when photographing (imaging) the object, the filter drive unit 42 moves the light passing portion out of the optical path covering from the optical image forming unit 12 to the light receiving unit 20. Thereby, the camera can photograph (image) the image of the object.

The process in which the distance distribution data of the object are calculated from the stereoscopic image and the imaging conditions of the object are adjusted is the same as that in the first embodiment (eleventh embodiment), thus a description thereof omitted here.

According to the present embodiment which differs from the first embodiment, both the stereoscopic image and the object can be imaged using the same optical system. Thus, the common optical image forming unit 12, the color filter 19 and the light receiving unit are used in imaging the object as well as measuring the distance distribution of the object, so that the camera can be made compact-sized and also can be manufactured at a lower cost.

Fourteenth Embodiment

Figure 20:
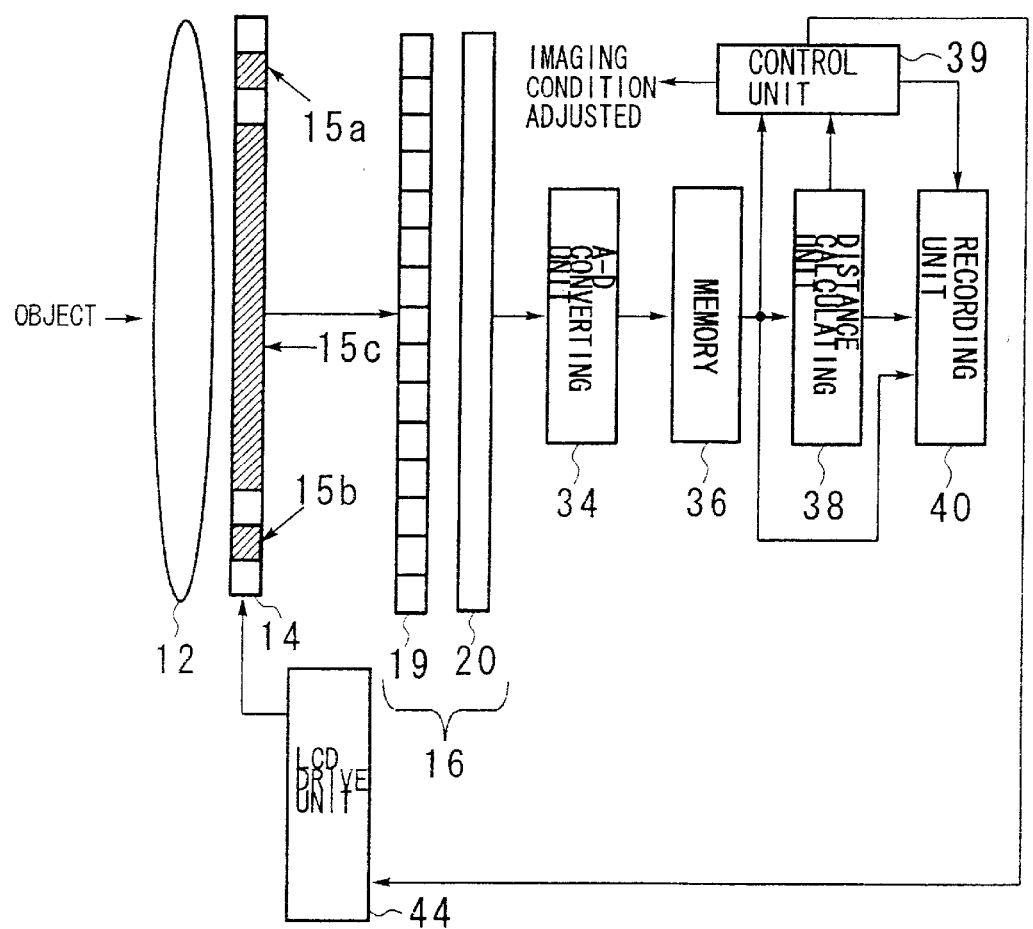
FIG. 20 shows a structure of a camera exemplifying a stereoscopic imaging apparatus according to the fourteenth embodiment.

FIG. 20 shows a structure of a camera exemplifying a stereoscopic imaging apparatus according to the fourteenth embodiment. The camera of the present embodiment comprises: an optical image forming unit 12; a light passing portion 14; a color filter 19; a light receiving unit 20; an LCD drive unit 44; an A-D converting unit 34; a memory 36; a distance calculating unit 38; a control unit 39; and a recording unit 40.

The optical image forming unit 12, color filter 19, light receiving unit 20, A-D converting unit 34, memory 36, distance calculating unit 38 and recording unit 40 in FIG. 20 are the same as those in the first and eleventh embodiments, so a description thereof is omitted here. The control unit 39 is the same as that in the first and eleventh embodiments except where the control unit 39 controls the LCD drive unit 44, so a description thereof is omitted here.

The light passing portion 14 includes the first, second and third openings 15a, 15b and 15c. The first and second openings 15a and 15b are provided in the close peripheral vicinity of the optical image forming unit 12 while the third opening 15c is provided in a region including an optical axis. Moreover, the third opening 15c occupies a larger region than the first and second openings 15a and 15b do.

The first, second and third openings 15a, 15b an 15c may be LCD optical shutters. In that case, the transmission and shielding of the light can be electrically switched at the openings by the electro-optic effect.

The LCD drive unit 44 can control the switching of transmission and shielding of the first, second and third openings (15a, 15b and 15c) of the light passing portion 14. The control unit 39 controls the LCD drive unit 44 so as to perform a desired operation.

When imaging a stereoscopic image of the object, the LCD drive unit 44 causes to electrically open the first and second openings 15a and 15b of the light passing portion 14, and causes to electrically close the third opening 15c. Thereby, the camera can image the stereoscopic image of the object.

When imaging an object, the LCD drive unit 44 causes to electrically open the third opening 15c of the light passing portion 14, and causes to electrically close the first and second openings 15a and 15b. Thereby, the camera can photograph an image of the object.

The process in which the distance distribution data on the object are calculated from the stereoscopic image so as to adjust the imaging conditions of the object is the same as in the first and eleventh embodiment, so a description thereof is omitted here.

Though the description has been made in a case where the first and second openings 15a and 15b of the light passing portion 14 are located outwardly from the third opening 15c in the above, the present embodiment is not limited thereto. For example, the first and second openings 15a and 15b may be located inwardly of the third opening 15c.

In that case, when imaging the stereoscopic image, the third opening 15c is electrically closed while the first and second openings 15a and 15b are electrically opened, then the object is photographed. When imaging the object, the third opening 15c is opened and then the object is photographed.

In this manner, when the first and second openings 15a and 15b of the light passing portion 14 are provided inside the third opening 15c, the third opening 15c can be provided in a manner such that the third opening 15c covers the whole region of the optical image forming unit 12. Thus, the region of the optical image forming unit 12 can be effectively utilized.

By implementing the fourteenth embodiment, the stereoscopic image as well as the object can be imaged utilizing the same optical system, without moving the light passing portion 14 out of the optical path covering from the optical image forming unit 12 to the light receiving unit 20. Therefore, in the course of imaging the object and measuring the distance distribution of the object, the camera can be made compact-sized and can be produced at a lower cost as a result of utilizing the optical image forming unit 12, light passing portion 14, color filter 19 and the light receiving unit 29 which are all commonly used throughout.

Fifteenth Embodiment

The fifteenth embodiment represents the configuration of the seventh embodiment shown in FIG. 11 combined with the distance calculating unit 38 described in the eleventh embodiment shown in FIG. 16.

Sixteenth Embodiment

The sixteenth embodiment represents the configuration of the eighth embodiment shown in FIG. 12 combined with the distance calculating unit 38 described in the eleventh embodiment shown in FIG. 16.

Seventeenth Embodiment

The seventeenth embodiment represents the configuration of the ninth embodiment shown in FIG. 13 combined with the distance calculating unit 38 described in the eleventh embodiment shown in FIG. 16.

Eighteenth Embodiment

The eighteenth embodiment represents the configuration of the tenth embodiment shown in FIG. 14 combined with the distance calculating unit 38 described in the eleventh embodiment shown in FIG. 16.

Nineteenth Embodiment

Figure 21:
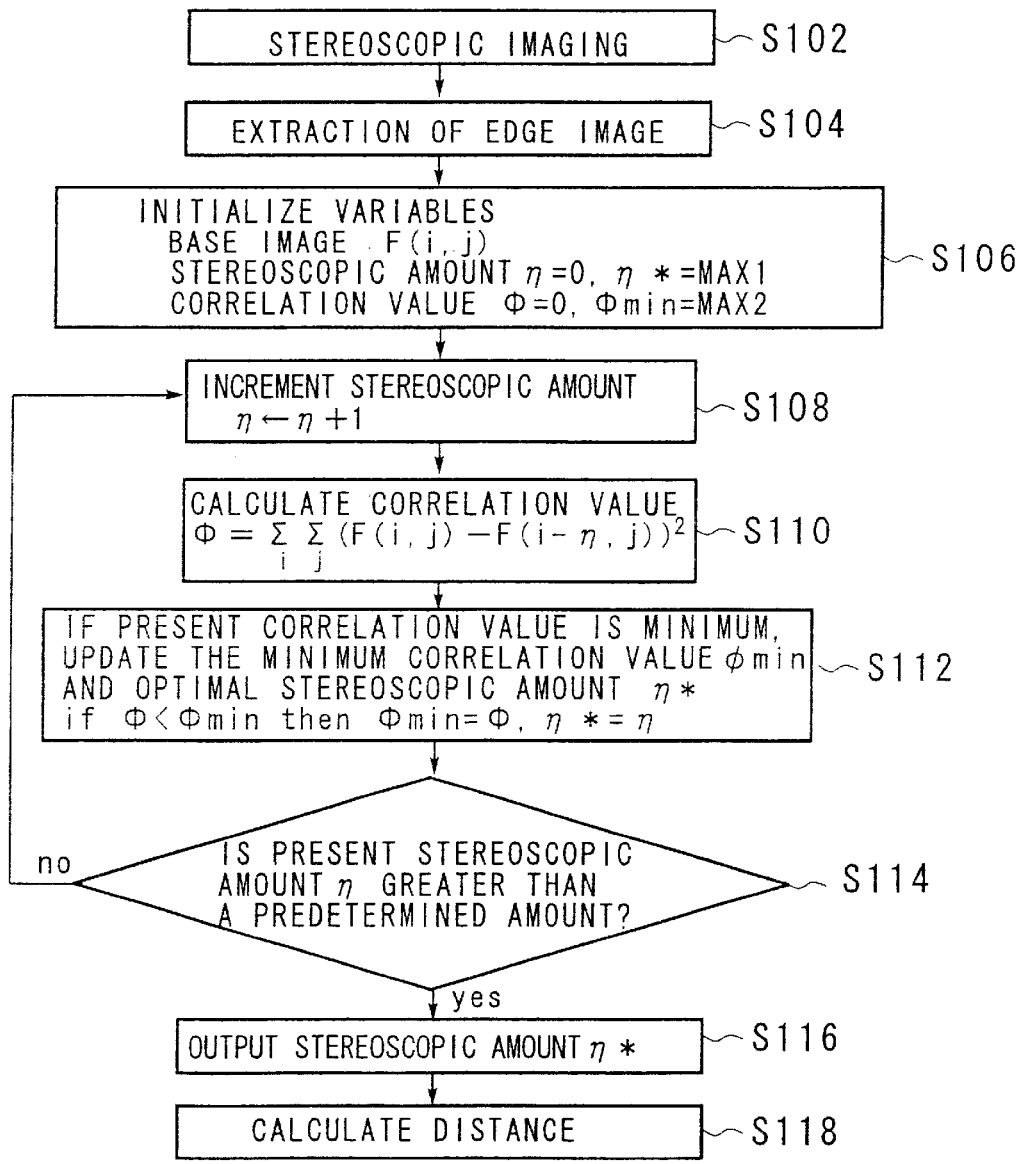
FIG. 21 is a flowchart showing a method for imaging the stereoscopic image according to the nineteenth embodiment.

FIG. 21 is a flowchart showing a method for imaging the stereoscopic image according to the nineteenth embodiment.

Referring to FIG. 21, the method for imaging the stereoscopic image according to the present embodiment will be described. The imaging unit 16 picks up an image of the object at the light receiving unit via the light passing portion which restricts the passage of the light in the region other than the different points (S102). The edge extracting unit 22 extracts the edge image on a specific region in the image photographed by the light receiving unit (S104).

The auto-correlation calculating unit 24 proceeds to put a value of the pixel data of the coordinates (x, y) in the (x, y) coordinate system of the edge image in the specific region, as F(i, j) and initializes necessary variables (S106). The stereoscopic amount $\eta$ is initialized to 0 and the optimum value $\eta^*$ of the stereoscopic amount is initialized to a predetermined value MAX 1. The correlation value $\Phi$ is initialized to 0 while the minimum value $\Phi$min of the correlation value is initialized to a predetermined value MAX 2. Here, suppose that MAX 1 is sufficiently lager than the stereoscopic amount while MAX 2 is sufficiently larger than the correlation value.

Next, the auto-correlation calculating unit 24 increments the stereoscopic amount $\eta$ by 1 (S108), and calculates the correlation value $\Phi$ by the following equation (S110).

$$\Phi(\eta, \xi) = \Sigma i \Sigma j [F(i, j) - F(i-\eta, j)]^2$$

In the stereoscopic amount detecting unit 26, when the correlation value $\Phi$ obtained for the present stereoscopic amount $\eta$ is less than the minimum value $\Phi$min which is the minimum among the correlation values $\Phi$ obtained so far, the current correlation value $\Phi$ is substituted into the minimum value $\Phi$min of the correlation value and the current stereoscopic amount η is substituted into the optimum value η* of the stereoscopic amount (S112). When the present stereoscopic amount η is not greater than a predetermined amount, return to step S108, and repeat the steps S108, S110 and S112.

In the stereoscopic detecting unit 26, when the present stereoscopic amount η is greater than the predetermined amount, the optimum value η* of the stereoscopic amount is output (S116), and the distance between the optical image forming unit and the object which is image-formed in the specific region is calculated based on the optimum value η* of the stereoscopic amount (S118). The method by which to calculate the distance up to the object based on the stereoscopic amount is the same as in the first embodiment, and a description thereof is omitted here.

According to the stereoscopic imaging method of the present embodiment, a plurality of stereoscopic images viewed from different points are imaged and the edge image is extracted on the specific region of the image so as to obtain the stereoscopic amount of the specific region, so that the distance distribution data on the whole object can be obtained. Thereby, in addition to the data on color distribution, brightness distribution, textural distribution and so on of the object's image, a main object is further reliably extracted based on the distance distribution data of the object.

Twentieth Embodiment

Figure 22:
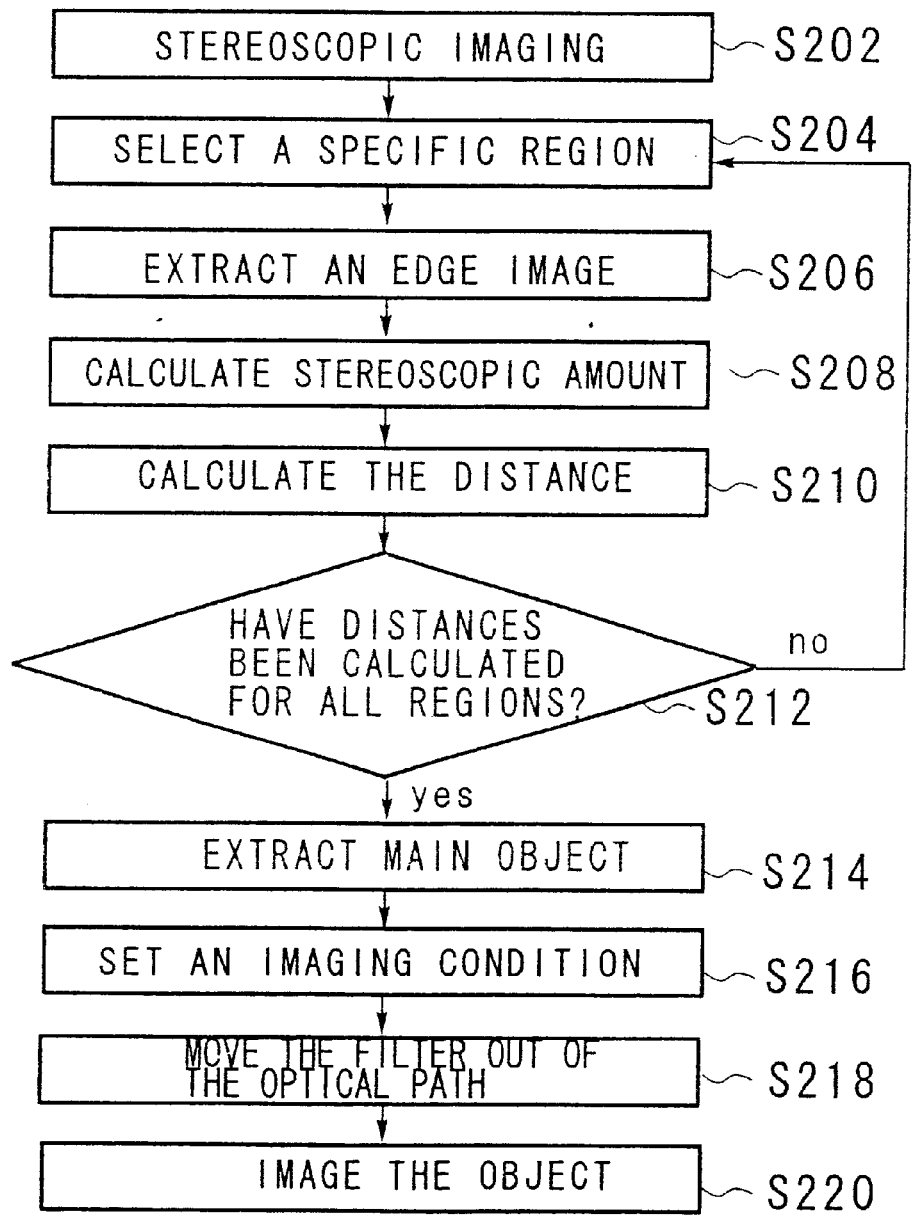
FIG. 22 is a flowchart showing a method for imaging the stereoscopic images according to the twentieth embodiment.

FIG. 22 is a flowchart showing a method for imaging the stereoscopic images according to the twentieth embodiment. Referring to FIG. 22, the method for imaging the stereoscopic image according to the present embodiment will be described. The imaging unit 16 picks up an image of the object at the light receiving unit via the light passing portion which restricts the passage of the light in the region other than the different points (S202). The edge extracting unit 22 selects a specific region in the image photographed in the light receiving unit (S204) and extracts the edge image on said specific region (S206).

The auto-correlation calculating unit 24 calculates the correlation between the edge image of the specific region and the reference image obtained by shifting said edge image in the stereoscopic direction while a shifted amount is varied for a predetermined amount. The stereoscopic detecting unit 26 calculates the stereoscopic amount between the specific region's edge image and the reference image based on the shifted amount at which the correlation becomes minimum (S208). Based on the thus obtained stereoscopic amount, the stereoscopic detecting unit 26 calculates the distance between the optical image forming unit to the object that is image-formed in the specific region (S210).

The process S208 in which the stereoscopic amount is calculated based on the correlation is the same as the processes S106 through S116 shown in FIG. 21, moreover, the method by which to calculate the distance of the object based on the stereoscopic amount is the same as in the first embodiment, so a description thereof is omitted here.

The stereoscopic detecting unit 26 examines whether or not the distance is calculated for all necessary regions imaged in the light receiving unit (S212), and when the distance for all necessary regions has not been calculated, return to the step S204 and select a next specific region so as to repeat the processes S206 through S210.

If the distance for all necessary regions has been calculated, the distance distribution data on the whole object can be obtained. In addition to the data on the color distribution, brightness distribution, textural distribution and so on of the object's image, the control unit 39 extracts the main object based on the distance distribution data (S214). Moreover, the control unit 39 appropriately adjusts the imaging conditions for the extracted main object, such as focus, aperture amount, exposure time and so on (S216).

The control unit 39 controls the filter drive unit 42, so that the light passing portion is moved out of an optical path defined by a space up to where the object is received by the light receiving unit (S218), then the object is imaged (S220). According to another embodiment, the control unit 39 may control the LCD drive unit 44 in the step S218 so that the openings of the light passing portion are opened and closed electrically.

By implementing the stereoscopic imaging method according to the present embodiment, the distance distribution of the object imaged on each pixel can be obtained, so that the main object can be further reliably extracted based on the distance distribution of the object, in addition to the data on color distribution, brightness distribution, textural distribution and so on of the object's image. Thereby, the object can be imaged in a manner such that the imaging conditions for the extracted main object such as focus, aperture amount and exposure time and so on are appropriately adjusted.

As evident from the above description, according the present embodiments, the stereoscopic images, while the object is viewed from different points, are simultaneously imaged, and the stereoscopic amount is detected from said images, so that the distance distribution of the object can be obtained.

Although the present invention has been described by way of exemplary embodiments, it should be understood that many changes and substitutions may be made by those skilled in the art without departing from the spirit and the scope of the present invention which is defined only by the appended claims.

What is claimed is:

1. A stereoscopic imaging apparatus for imaging a plurality of stereoscopic images obtained when an object is viewed from different points, the apparatus comprising:
   an optical image forming unit having a single optical axis, which image-forms the object;
   a light receiving unit in which a plurality of light receiving elements are arranged and the object is image-formed by said optical image forming unit;
   a light passing portion including first and second openings through which light having passed through first and second regions in said optical image forming unit is irradiated to said light receiving unit; and
   an optical separation portion which simultaneously images both a first image having passed through the first opening and a second image having passed through the second opening, on the different light receiving elements of said light receiving unit.

2. Apparatus of claim 1, wherein the first and second openings of said light passing portion are equipped with first and second opening optical filters which transmit different optical light components, respectively.

3. Apparatus of claim 2, wherein said optical separation portion includes:
   a first light receiving portion optical filter which transmits again a light component having transmitted through the first opening optical filter; and
   a second light receiving portion optical filter which transmits again a light having transmitted through the second opening optical filter, wherein the first light receiving portion optical filter and the second light receiving optical filter are arranged in an alternate order.

4. Apparatus of claim 3, wherein the first and second opening optical filters of the light passing portion are opening specific wavelength component transmitting filters which transmit different specific wavelength components of the light, respectively.

5. Apparatus of claim 4, wherein said optical separation portion includes:
- a first light receiving portion specific wavelength component transmitting filter which transmits the light having the same wavelength component as the first opening specific wavelength transmitting filter of said light passing portion; and
- a second light receiving portion specific wavelength component transmitting filter which transmits the light having the same wavelength component as the second opening specific wavelength component transmitting filter of said light passing portion,
- wherein said light receiving unit is covered in a manner such that the first and second light receiving portion specific wavelength component transmitting filters are arranged in alternate order.

6. Apparatus of claim 5, wherein the first light receiving portion specific wavelength component transmitting filter includes:
- filters that transmit specific RGB wavelength components ($\lambda R1, \lambda G1$ and $\lambda B1$), respectively, and the second light receiving portion specific wavelength component transmitting filter includes:
- filters that transmit specific RGB wavelength components ($\lambda R2, \lambda G2$ and $\lambda B2$), respectively, and
- wherein the filter transmitting the wavelength $\lambda R1$ and the filter transmitting $\lambda R2$ are arranged adjacently; the filter transmitting the wavelength $\lambda G1$ and the filter transmitting $\lambda G2$ are arranged adjacently; and the filter transmitting the wavelength $\lambda B1$ and the filter transmitting $\lambda B2$ are arranged adjacently.

7. Apparatus of claim 3, wherein the first and second opening optical filter of said light passing portion are opening specific polarization component transmitting filters that transmit the light having a polarization plane of the horizontal direction and a polarization plane of the vertical direction, respectively.

8. Apparatus of claim 7, wherein said optical separation portion includes light receiving portion specific polarization component transmitting filters which transmit the light having polarization planes of the horizontal and vertical directions, and wherein the light receiving portion specific polarization component transmitting filters which transmit the light having polarization planes of the horizontal and vertical directions are arranged in an alternate manner so as to cover said light receiving unit.

9. Apparatus of claim 7, wherein said optical separation portion includes a polarization component separating portion that separates the light having polarization planes of the horizontal and vertical directions, and said light receiving unit includes:
- a first light receiving plane which receives light having the horizontal-direction polarization plane separated by the polarization component separating portion; and
- a second light receiving plane which receives light having vertical-direction polarization plane separated by the polarization component separating portion.

10. Apparatus of claim 1, further comprising an electrically separating portion which electrically separates the first image that is imaged by said light receiving unit from the second image that is imaged by said light receiving unit.

11. Apparatus of claim 1, wherein the light receiving element is an charge-coupled device, and said light receiving unit comprises a photoelectric conversion image element in which a plurality of charge-coupled devices are arranged.

12. Apparatus of claim 1, wherein said first and second images are formed from a first area and a second area of the object, respectively, and wherein said light passing portion further includes a first filter and a second filter being aligned for passing said first and second images therethrough, respectively.

13. A camera for acquiring data on a distance between the camera and an object, comprising:
- a first optical image forming unit having a single optical axis, which image-forms the object;
- a first light receiving unit in which a plurality of light receiving elements are arranged and the object is image-formed by said first optical image forming unit;
- a light passing portion including first and second openings through which light having passed through first and second regions in said first optical image forming unit is irradiated to said first light receiving unit;
- an optical separation portion which simultaneously images both a first image having passed through the first opening and a second image having passed through the second opening, on the different light receiving elements of said first light receiving unit; and
- a distance calculating unit which calculates a distance between said optical image forming unit and at least a point on the object, based on the first and second images.

14. Camera of claim 13, further comprising:
- a second optical image forming unit which image forms the object;
- a second light receiving unit which image-forms the object by said second optical image forming unit; and
- a control unit which controls at least one of focusing and aperture of said optical image forming unit, and exposure time of said second light receiving unit, based on the distance calculated by said distance calculating unit.

15. Camera of claim 14, further comprising a recoding unit which records an image imaged by said second light receiving portion and the distance calculated by said distance calculating unit.

16. Camera of claim 13, further comprising:
- a second light receiving unit which image-forms the object by said first optical image forming unit; and
- a control unit which controls at least one of focusing and aperture of said first optical image forming unit, and exposure time of said second light receiving unit, based on the distance calculated by said distance calculating unit.

17. Camera of claim 13, further comprising a drive unit which moves said light passing portion and said optical separation portion out of an optical path defined by a space such that the object is light-received by said first light receiving unit.

18. Camera of claim 13, wherein said light passing portion further includes a third opening which irradiates to said first light receiving unit the light having passed through a third region in said first optical image forming unit, wherein
while said optical serration portion opens the first and second openings and closes the third opening in said light passing portion, the first image having passed through the first opening and the second image having passed through the second opening are simultaneously imaged on the different light receiving elements, and wherein, while said optical separation portion closes the first and second openings and opens the third opening in said light passing portion, the image having passed through the third opening is imaged on the light receiving element.

19. Camera of claim 18, wherein the first, second and third openings in said light passing portion include an LCD shutter.

20. Camera of claim 13, wherein said distance calculating unit calculates a distance between said optical image forming unit and the object that is image-formed on a first pixel address of the first image, based on the first pixel address of the first image and a second pixel address in the second image of the object that is image-formed on the first image address.

21. Camera of claim 13, wherein said first and second images are formed from a first area and a second area of the object, respectively, and wherein said light passing portion further includes a first filter and a second filter being aligned for passing said first and second images therethrough, respectively.

22. A stereoscopic imaging apparatus for imaging a plurality of stereoscopic images obtained when an object is viewed from different points, the apparatus comprising:

an optical image forming unit having a single optical axis, which image-forms the object;

a light receiving unit in which a plurality of light receiving elements are arranged and the object is image-formed by said optical image forming unit;

a light passing portion including first and second openings through which light having passed through first and second regions in said optical image forming unit is irradiated to said light receiving unit;

an imaging unit which simultaneously images both a first image that image-forms the object after passing through the first opening and a second image that image-forms the object after passing through the second opening, on said light receiving unit; and a distance calculating unit which calculates a distance between said optical image forming unit and at least a point on the object, based on the image imaged on said light receiving unit.

23. Apparatus of claim 22, wherein said distance calculating unit includes a stereoscopic amount detecting unit which detects a stereoscopic amount of the first image having passed through the first opening and the second image having passed through the second opening in terms of a specific region of an image imaged in said light receiving unit, so that the distance between the optical image forming unit and the object imaged at the specific region is calculated based on the stereoscopic amount.

24. Apparatus of claim 23, said distance calculating unit further includes:

an auto-correlation calculating unit which calculates correlation between the image of the specific region imaged in said light receiving unit and a reference image acquired by shifting said image in a stereoscopic direction, while a shifted amount thereof is varied by a predetermined amount, so that said stereoscopic detecting unit obtains the stereoscopic amount utilizing the correlation calculated by said auto-correlation calculating unit.

25. Apparatus of claim 24, wherein said distance calculating unit further includes:

an edge extracting unit which extracts an edge image of the image imaged by said light receiving unit, whereby said auto-correlation calculating unit calculates correlation between the edge image of the specific region imaged by said light receiving unit and the reference image acquired by shifting the edge image in the stereoscopic direction while a shifted amount is varied by a predetermined amount.

26. Apparatus of claim 24, wherein said auto-correlation calculating unit calculates correlation between the image of the specific region imaged by said light receiving unit and the reference image acquired by shifting said image in the substantially same direction as that in which the first and second openings of said light passing portion are arranged, while a shifted amount is varied by a predetermined amount.

27. Apparatus of claim 22, wherein the light receiving element is an charge-coupled device, and said light receiving unit comprises a photoelectric conversion image element in which a plurality of charge-coupled devices are arranged.

28. Apparatus of claim 22, further comprising:

a second optical image forming unit which image forms the object;

a second light receiving unit which image-forms the object by said second optical image forming unit; and a control unit which controls at least one of focusing and aperture of said second optical image forming unit, and exposure time of said second light receiving unit, based on the distance calculated by said distance calculating unit.

29. Apparatus of claim 28, further comprising a recoding unit which records an image imaged by said second light receiving portion and the distance calculated by said distance calculating unit.

30. Apparatus of claim 22, further comprising:

a second light receiving unit which image-forms the object by said first optical image forming unit; and a control unit which controls at least one of focusing and aperture of said first optical image forming unit, and exposure time of said second light receiving unit, based on the distance calculated by said distance calculating unit.

31. Apparatus of claim 22, further comprising:

a drive unit which moves said light passing portion out of an optical path defined by a space such that the object is light-received by said light receiving unit; and a control unit which controls said optical image forming unit or said light receiving unit utilizing the distance calculated by said distance calculating unit.

32. Apparatus of claim 22, wherein said light passing portion further includes:

a third opening which irradiates to said light receiving unit the light having passed through a third region in said optical image forming unit;

a control unit which controls said optical image forming unit or said light receiving portion based on the distance calculated by said distance calculating unit; and a drive unit such that, in the event of imaging a stereoscopic image of the object, while the third opening is being closed and the first and second openings of the light passing portion are opened, an image having passed through the first opening and an image having passed through the second opening are simultaneously imaged, and, in the event of imaging the object, while the third opening of said light passing portion is being opened, an image having passed through is imaged by said light receiving unit.

33. Apparatus of claim 32, wherein the first, second and third openings in said light passing portion include an LCD shutter.

34. Apparatus of claim 33, wherein the first and second openings of said light passing portion are provided in the peripheral vicinity of said optical image forming unit, the third opening of said light passing portion is provided in a region including an optical axis of said optical image forming unit, and the third opening occupies larger region than that occupied by the first and second openings.

35. Apparatus of claim 22, wherein said first and second images are formed from a first area and a second area of the object, respectively, and wherein said light passing portion further includes a first filter and a second filter being aligned for passing said first and second images therethrough, respectively.

36. A stereoscopic imaging method for imaging a plurality of stereoscopic images acquired when an object is viewed from different points, the method comprising:

picking up an image of the object at a light receiving unit via a light passing portion which restricts a passage of light in a region other than the different points;

extracting an edge image of the image imaged in the light receiving unit;

calculating correlation between the edge image of a specific region and a reference image acquired by shifting the edge image in a stereoscopic direction connecting the different points while a shifted amount is varied by a predetermine amount;

obtaining a stereoscopic amount of the edge image of the specific region and the reference image based on the shifted amount at which the level of the correlation becomes minimum; and calculating a distance between an optical image forming unit and the object imaged at the specific region.

37. A method of claim 36, further comprising:

adjusting an imaging condition based on the calculated distance;

removing a restriction set forth at said picking up the image; and imaging the object under the adjusted imaging condition.

38. A stereoscopic imaging method for imaging a plurality of stereoscopic images acquired when an object is viewed from different points, the method comprising:

picking up an image of the object at a light receiving unit via a light passing portion which restricts a passage of light in a region other than the different points;

extracting an edge image on a specific region in the image imaged by the light receiving unit;

putting values of pixel data of coordinates (x, y) of the edge image in the specific region, as F(i, j) and initializing variables such that a stereoscopic amount $\eta$ is initialized to 0, an optimum value $\eta^*$ of the stereoscopic amount is initialized to a predetermined value, a correlation value $\Phi$ is initialized to 0 while a minimum value $\Phi$min of the correlation value is initialized to a predetermined value;

incrementing the stereoscopic amount $\eta$ by 1 and calculating the correlation value $\Phi$ by $$\Phi(\eta, \xi) = \Sigma i \Sigma j [F(i, j) - F(i-\eta, j)]^2;$$

substituting the correlation value $\Phi$ into the minimum value $\Phi$min of the correlation value and substituting the stereoscopic amount $\eta$ into the optimum value $\eta^*$ of the stereoscopic amount in the event that the correlation value $\Phi$ is less than the minimum value $\Phi$min;

returning to said incrementing and calculating if the stereoscopic amount $\eta$ is not greater than a predetermined amount;

outputting the optimum value $\eta^*$ of the stereoscopic amount if the stereoscopic amount $\eta$ is greater than the predetermined amount; and calculating the distance of the object based on the optimum value $\eta^*$.

* * * * *